United States Patent
O'Gara

(10) Patent No.: US 6,528,167 B2
(45) Date of Patent: Mar. 4, 2003

(54) POROUS HYBRID PARTICLES WITH ORGANIC GROUPS REMOVED FROM THE SURFACE

(75) Inventor: John E. O'Gara, Ashland, MA (US)

(73) Assignee: Waters Investments Limited, New Castle, DE (US)

( * ) Notice: Subject to any disclaimer, the term of this patent is extended or adjusted under 35 U.S.C. 154(b) by 10 days.

(21) Appl. No.: 09/774,533

(22) Filed: Jan. 31, 2001

(65) Prior Publication Data

US 2002/0147293 A1 Oct. 10, 2002

(51) Int. Cl.$^7$ ................................. B32B 1/00
(52) U.S. Cl. ................ 428/405; 428/402; 428/404; 55/524; 96/101; 96/108; 96/290
(58) Field of Search .................. 996/101, 108, 996/290; 428/404, 405, 402; 55/524

(56) References Cited

U.S. PATENT DOCUMENTS

| | | | |
|---|---|---|---|
| 3,892,678 A | 7/1975 | Halasz et al. ................. | 252/426 |
| 3,935,299 A | 1/1976 | Kiselev et al. ............... | 423/338 |
| 4,017,528 A | 4/1977 | Unger et al. ............. | 260/448.8 |
| 4,029,583 A | 6/1977 | Ho Chang et al. ........... | 210/502 |
| 4,104,363 A | 8/1978 | Vozka et al. ................. | 423/338 |
| 4,169,069 A | 9/1979 | Unger et al. ................. | 252/316 |
| 4,724,207 A | 2/1988 | Hou et al. .................... | 435/180 |
| 4,775,520 A | * 10/1988 | Unger et al. ................ | 423/335 |
| 4,911,903 A | 3/1990 | Unger et al. ................. | 423/335 |
| 4,983,369 A | 1/1991 | Barder et al. ................ | 423/335 |
| 5,068,387 A | 11/1991 | Kleyer et al. ................ | 556/485 |
| 5,071,565 A | 12/1991 | Fritz et al. .................... | 210/692 |
| 5,108,595 A | 4/1992 | Kirkland et al. .......... | 210/198.2 |
| 5,137,627 A | 8/1992 | Feibush ..................... | 210/198.2 |
| 5,154,822 A | 10/1992 | Simpson et al. .......... | 210/198.2 |
| 5,194,333 A | 3/1993 | Ohnaka et al. .............. | 428/405 |

(List continued on next page.)

OTHER PUBLICATIONS

Bereznitski, et al. "Characterization of silica–based octyl phases of different bonding density part II. Studies of surface properties and chromatographic selectivity," 1998. *J. Chromatogr. A* 828:59–73.

Boury, et al. "Generation of porosity in a hybrid organic–inorganic xerogel by chemical treatment," 1999. *New J. Chem.* 23:531–538.

Boury, et al. "Hybrid organic–inorganic xerogel access to meso–and microporous silica by thermal and chemical treatment," 1999. *Chem. Mater.* 11:281–291.

Collioud, et al. "Oriented and covalent immobilization of target molecules to solid supports: synthesis and application of a light–activatable and thiol–reactive cross–linking reagent," 1993. *Bioconjugate* 4:528–536.

Czajkowska, et al. "Adsorption, thermogravimetric, and chromatographic studies of bare silicas and silica–based octyl bonded phases," 1998. *J. Liq. Chromatogr. Relat. Technol.* 21:1957–1977.

Jones, G.R., et al. "The oxidation of the carbon–silicon bond," 1996. *Tetrahedron*, 52(22):7599–7662.

MacBeath, et al. "Printing proteins as microarrays for high–throughput function determination," 2000. *Science* 289:1760–1763.

Maskos, et al. "Oligonucleotide hybridizations on glass supports: a novel linker for oligonucleotide synthesis and hybridization properties of oligonucleotides synthesised in situ," 1992. *Nucleic Acids Research* 20(7):1679–1684.

Nawrocki, et al. "Influence of silica surface chemistry and structure on the properties, structure and coverage of alkyl–bonded phases for high–performance liquid chromatography," 1988. *J. of Chromatography* 449(1):1–24.

Nawrocki, "Silica surface controversies, strong adsorption sites, their blockage and removal. Part 1," 1991. *Chromatographia* 31(3–4):177–192.

Neue, et al. "Use of high–performance LC packings from pH 1 to Ph 12," 1999 *American Laboratory*, p. 36–39.

O'Gara, et al. "Simple preparation of $C_8$ HPLC stationary phase with an internal polar functional group," 1995 *Analytical Chemistry* 67:3809–13.

O'Gara, et al. "Dependence of cyano bonded phase hydrolytic stability on ligand structure and solution pH," 2000 *J. Chromatogr. A* 893:245–251.

Reynolds, K.J. et al., "Submicron sized organo–silica spheres for capillary electrochromatography," 2000 *J. Liq. Chrom & Rel. Technol.*, 23(1):161–173.

Tamao, et al. "Oxidative cleavage of silicon–carbon bonds in organosilicon fluorides to alcohols," 1982 *Tetrahedron* 39(6):983–990.

Tamao, et al. "Hydrogen peroxide oxidation of the silicon–carbon bond in organoalkoxysilanes," 1983 *Organometallics* 2:1694–1696.

Tamao, K. "Oxidative cleavage of the silicon–carbon bond: Development, mechanism, scope, and limitations," 1996 *Advances in Silicon Chemistry*, 3:1–62.

Unger, K.K. et al., "Recent developments in the evaluation of chemically bonded silica packings for liquid chromatography," *J. Chromatogr.* 1976, 125(1):115–127.

Yang et al. "Oxidative cleavage of carbon–silicon bond as a new method to characterize bonded stationary phases on silica gel," 1998 *Anal. Chem.* 70:2827–2830.

Primary Examiner—Margaret G. Moore
(74) Attorney, Agent, or Firm—Lahive & Cockfield LLP; Elizabeth A. Hanley; Peter C. Lauro

(57) ABSTRACT

A material for chromatographic separations, processes for its preparation, and separation devices containing the chromatographic material. In particular, porous inorganic/organic hybrid materials are provided with a decreased concentration of surface organic groups. These particles may be surface modified and have enhanced stability at low pH.

43 Claims, No Drawings

U.S. PATENT DOCUMENTS

| | | | |
|---|---|---|---|
| 5,256,386 A | 10/1993 | Nystrom et al. | 423/338 |
| 5,374,755 A | 12/1994 | Neue et al. | 556/400 |
| 5,378,790 A | 1/1995 | Michalczyk et al. | 528/35 |
| 5,425,930 A | 6/1995 | Anderson | 423/338 |
| 5,498,678 A | 3/1996 | Steffier | 526/200 |
| 5,558,849 A | 9/1996 | Sharp | 423/338 |
| 5,565,142 A | 10/1996 | Deshpande et al. | 252/315.2 |
| 5,624,875 A | 4/1997 | Nakanishi et al. | 501/39 |
| 5,637,135 A * | 6/1997 | Ottenstein et al. | 96/101 |
| 5,651,921 A | 7/1997 | Kaijou | 252/309 |
| 5,667,674 A | 9/1997 | Hanggi et al. | 210/198.2 |
| 5,734,020 A | 3/1998 | Wong | 530/350 |
| 5,856,379 A | 1/1999 | Shiratsuchi et al. | 523/209 |
| 5,869,152 A | 2/1999 | Colon | 428/34.4 |
| 5,965,202 A | 10/1999 | Taylor-Smith et al. | 427/245 |
| 5,976,479 A | 11/1999 | Alcaraz et al. | 423/335 |
| 6,022,902 A * | 2/2000 | Koontz | 521/53 |
| 6,027,643 A | 2/2000 | Small et al. | 210/198.2 |

* cited by examiner

POROUS HYBRID PARTICLES WITH ORGANIC GROUPS REMOVED FROM THE SURFACE

BACKGROUND OF THE INVENTION

Packing materials for liquid chromatography (LC) are generally classified into two types: those having organic or polymeric carriers, e.g., polystyrene polymers; and those having inorganic carriers typified by silica gel. The polymeric materials are chemically stable against alkaline and acidic mobile phases; therefore, the pH range of the eluent used with polymeric chromatographic materials is wide, compared with the silica carriers. However, polymeric chromatographic materials generally result in columns having low efficiency, leading to inadequate separation performance, particularly with low molecular-weight analytes. Furthermore, polymeric chromatographic materials shrink and swell upon solvent changeover in the eluting solution.

On the other hand, silica gel-based chromatographic devices, e.g., HPLC columns, are most commonly used. The most common applications employ a silica which has been surface-derivatized with an organic functional group such as octadecyl ($C_{18}$), octyl ($C_8$), phenyl, amino, cyano group, etc. As a stationary phase for HPLC, these packing materials result in columns with high theoretical plate number/high efficiency, and do not evidence shrinking or swelling. Silica gel is characterized by the presence of silanol groups on its surface. During a typical derivatization process such as reaction with octadecyldimethylchlorosilane, at least 50% of the surface silanol groups remain unreacted.

A drawback with silica-based columns is their limited hydrolytic stability. First, the incomplete derivatization of the silica gel leaves a bare silica surface which can be readily dissolved under alkaline conditions, generally pH>8.0, leading to the subsequent collapse of the chromatographic bed. Secondly, the bonded phase can be stripped off of the surface under acidic conditions, generally pH<2.0, and eluted off the column by the mobile phase, causing loss of analyte retention, and an increase in the concentration of surface silanol groups. These problems have been attributed to free silanol group activity and hydrolytic instability of silica-based stationary phases. To address to these problem, many methods have been tried including use of ultrapure silica, carbonized silica, coating of the silica surface with polymeric materials, endcapping free silanol groups with a short-chain reagent such as trimethylchlorosilane, and the addition of suppressors such as amines to the eluent. These approaches have not proven to be completely satisfactory in practice.

Hybrid columns which combine organic and silica systems are known (XTerra™ MS $C_{18}$ (Waters Corp., Milford, Mass. USA) and offer, potentially, the benefits of both silica and organic based materials. Hybrid particles have the advantages of both silica and polymer packing materials. In particular, hybrid particles offer mechanical strength, high efficiency, ability to separate a wide range of compounds, high chemical and temperature stability with little to no peak tailing, and improved peak shape for basic compounds. However, these materials have certain limitations, also.

Many of the limitations of hybrid silica-based columns can be attributed to surface organic (i.e., methyl groups). In particular, the presence of surface organic groups lead to lower bonded phase surface concentrations after bonding with silanes, e.g., $C_{18}$ and $C_8$ silanes, in comparison to silica phases, presumably because the methyl groups on the surface are unreactive to bonding. Further, in $C_{18}$ bonded phases, surface organic groups may decrease the level of cross-bonding between adjacent $C_{18}$ ligands. This results in reduced low pH stability since the $C_{18}$ ligand has fewer covalent bonds to the surface of the particle. Ultimately, reduced retention times and peak compression can result from the reduced low pH stability caused by surface organic groups.

SUMMARY OF THE INVENTION

The present invention relates to improved hybrid chromatographic materials which demonstrate improved stability and separation characteristics. The chromatographic hybrid particles can be used for performing separations or for participating in chemical reactions. These particles feature a surface with a desired bonded phase, e.g., ODS or CN, and a controlled surface concentration of silicon-methyl groups. More particularly, surface silicon-methyl groups are selectively replaced with silanol groups. In so doing, the hybrid particles have substantially improved low pH stability, and improved chromatographic separation performance including reduced peak tailing.

In an embodiment, particles of the invention have an interior area and an exterior surface and are of a composition represented by:

$[A]_y[B]_x$ (Formula I)

where x and y are whole number integers and A is represented by:

$SiO_2/(R^1_p R^2_q SiO_t)_n$ (Formula II), and/or

$SiO_2/[R^3(R^1_r SiO_t)_m]_n$ (Formula III);

where $R^1$ and $R^2$ are independently a substituted or unsubstituted $C_1$ to $C_7$ alkyl group or a substituted or unsubstituted aryl group, $R^3$ is a substituted or unsubstituted $C_1$ to $C_7$ alkylene, alkenylene, alkynylene, or arylene group bridging two or more silicon atoms, p and q are 0, 1, or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2; and n is a number from 0.01 to 100. B is represented by:

$SiO_2/(R^4_v SiO_t)_n$ (Formula IV)

where $R^4$ may be hydroxyl, fluorine, alkoxy (e.g., methoxy), aryloxy, substituted siloxane, protein, peptide, carbohydrate, nucleic acid, and combinations thereof, and $R^4$ is not $R^1$, $R^2$, or $R^3$. v is 1 or 2, provided that when v=1, t=1.5, and when v=2, t=1; and n is a number from 0.01 to 100. The interior of the particle has a composition of A, the exterior surface of the particle has a composition represented by A and B, and the exterior composition is between about 1 and about 99% of the composition of B and the remainder including A. In these particles, $R^4$ may be represented by:

$—OSi(R^5)_2—R^6$ (Formula V)

where $R^5$ may be a $C_1$ to $C_6$ straight, cyclic, or branched alkyl, aryl, or alkoxy group, a hydroxyl group, or a siloxane group, and $R^6$ may be a $C_1$ to $C_{36}$ straight, cyclic, or branched alkyl (e.g., $C_{18}$, cyanopropyl), aryl, or alkoxy group, where the groups of $R^6$ are unsubstituted or substituted with one or more moieties such as halogen, cyano, amino, diol, nitro, ether, carbonyl, epoxide, sulfonyl, cation exchanger, anion exchanger, carbamate, amide, urea, peptide, protein, carbohydrate, and nucleic acid functionalities.

In another embodiment, $R^6$ may greater than about 2.5 $\mu$mol/m$^2$, more preferably greater than about 3.0 $\mu$mol/m$^2$, and still more preferably greater than about 3.5 $\mu$mol/m$^2$. In a preferred embodiment, the surface concentration of $R^6$ is between about 2.5 and about 3.7 $\mu$mol/m$^2$.

This invention further provides a method of preparation of particles for performing separations or for participating in chemical reactions, including: prepolymerizing a mixture of an organoalkoxysilane and a tetraalkoxysilane (e.g., tetramethoxysilane and tetraethoxysilane) in the presence of an acid catalyst to produce a polyalkoxysiloxane; preparing an aqueous surfactant containing suspension of the polyalkoxysiloxane, and gelling in the presence of a base catalyst so as to produce porous particles having silicon $C_1$ to $C_7$ alkyl groups, substituted or unsubstituted aryl groups, substituted or unsubstituted $C_1$ to $C_7$ alkylene, alkenylene, alkynylene, or arylene groups; modifying the pore structure of the porous particles by hydrothermal treatment; and replacing one or more surface $C_1$ to $C_7$ alkyl groups, substituted or unsubstituted aryl groups, substituted or unsubstituted $C_1$ to $C_7$ alkylene, alkenylene, alkynylene, or arylene groups of the particle with hydroxyl, fluorine, alkoxy, aryloxy, or substituted siloxane groups.

DETAILED DESCRIPTION OF THE INVENTION

The present invention will be more fully understood by reference to the definitions set forth below.

"Hybrid", e.g., as in "porous inorganic/organic hybrid particles" includes inorganic-based structures wherein an organic functionality is integral to both the internal or "skeletal" inorganic structure as well as the hybrid material surface. The inorganic portion of the hybrid material may be, e.g., alumina, silica, titanium or zirconium oxides, or ceramic material; in a preferred embodiment, the inorganic portion is silica. As noted before, exemplary hybrid materials are shown in U.S. Pat. No. 4,017,528. In a preferred embodiment where the inorganic portion is silica, "hybrid silica" refers to a material having the formula $SiO_2/(R^1_p R^2_q SiO_t)_n$ or $SiO_2/[R^3(R^1_r SiO_t)_m]_n$; wherein $R^1$ and $R^2$ are independently a substituted or unsubstituted $C_1$ to $C_7$ alkyl group, or a substituted or unsubstituted aryl group, $R^3$ is a substituted or unsubstituted $C_1$ to $C_7$ alkylene, alkenylene, alkynylene, or arylene group bridging two or more silicon atoms, p and q are 0, 1, or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2; and n is a number from 0.01 to 100.

A "bonded phase" can be formed by adding functional groups to the surface of hybrid silica. The surface of hybrid silica contains silanol groups, which can be reacted with a reactive organosilane to form a "bonded phase". Bonding involves the reaction of silanol groups at the surface of the hybrid particles with halo or alkoxy substituted silanes, thus producing a Si—O—Si—C linkage.

Generally, only a maximum of 50% of the Si—OH groups on heat treated silica can react with the trimethylsilyl entity, and less with larger entities such as the octadecylsilyl groups. Factors tending to increase bonding coverage include: silanizing twice, using a large excess of silanizing reagent, using a trifunctional reagent, silanizing in the presence of acid scavenger, performing secondary hydroxylation of the surface to be silanized, using a chlorinated solvent in preference to a hydrocarbon, and capping of the surface.

Some adjacent vicinal hydroxyls on the silica surface are at a distance such that difunctional reactions can occur between the silica surface and a difunctional or trifunctional reagent. When the adjacent hydroxyls on the silica surface are not suitably spaced for a difunctional reaction, then only a monofunctional reaction takes place.

Silanes for producing bonded silica include, in decreasing order of reactivity: $RSiX_3$, $R_2SiX_2$, and $R_3SiX$, where X is halo (e.g., chloro) or alkoxy. Specific silanes for producing bonded silica, in order of decreasing reactivity, include $C_8$—N(CH$_3$)$_2$, n-octyldimethyl(trifluoroacetoxy)silane ($C_8$—OCOCF$_3$), n-octyldimethylchlorosilane ($C_8$—Cl), n-octyldimethylmethoxysilane ($C_8$—OCH$_3$), n-octyldimethylethoxysilane ($C_8$—OC$_2$H$_5$), and bis-(n-octyldimethylsiloxane) ($C_8$—O—$C_8$). Monochlorosilane is the cheapest and most commonly used silane.

Other monochlorosilanes that can be used in producing bonded silica include: Cl—Si(CH$_3$)$_2$—(CH$_2$)$_n$—X, where X is H, CN, fluorine, chlorine, bromine, iodine, phenyl, cyclohexyl, dimethylamine, or vinyl, and n is 1 to 30 (preferably 2 to 20, more preferably 8 to 18); Cl—Si(CH$_3$)$_2$—(CH$_2$)$_8$—H (n-octyldimethylsilyl); Cl—Si(CH(CH$_3$)$_2$)$_2$—(CH$_2$)$_n$—X, where X is H, CN, fluorine, chlorine, bromine, iodine, phenyl, cyclohexyl, dimethylamine, or vinyl; and Cl—Si(CH(Phenyl)$_2$)$_2$—(CH$_2$)$_n$—X where X is H, CN, fluorine, chlorine, bromine, iodine, phenyl, cyclohexyl, dimethylamine, or vinyl.

Dimethylmonochlorosilane (Cl—Si(CH$_3$)$_2$—R) can be synthesized by a 2-step process such as shown below.

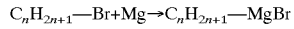

Alternatively, dimethylmonochlorosilane (Cl—Si(CH$_3$)$_2$—R) can be synthesized by a one-step catalytic hydrosilylation of terminal olefins. This reaction favors formation of the anti-Markovnikov addition product. The catalyst used may be hexachloroplatinic acid-hexahydrate (H$_2$PtCl$_6$·6H$_2$O).

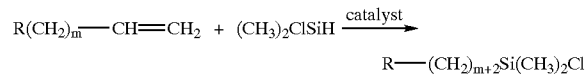

The surface derivatization of the hybrid silica is conducted according to standard methods, for example by reaction with octadecyldimethylchlorosilane in an organic solvent under reflux conditions. An organic solvent such as toluene is typically used for this reaction. An organic base such as pyridine or imidazole is added to the reaction mixture to catalyze the reaction. The thus-obtained product is then washed with water, toluene and acetone and dried at 100° C. under reduced pressure for 16 h.

"Functionalizing group" includes (typically) organic functional groups which impart a certain chromatographic functionality to a chromatographic stationary phase, including, e.g., octadecyl (C$_{18}$), phenyl, ion exchange, etc. Such functionalizing groups are present in, e.g., surface modifiers such as disclosed herein which are attached to the base material, e.g., via derivatization or coating and later crosslinking, imparting the chemical character of the surface modifier to the base material. In an embodiment, such surface modifiers have the formula $Za(R^5)_bSi—R$, where $Z=Cl$, Br, I, $C_1-C_5$ alkoxy, dialkylamino, e.g., dimethylamino or trifluoromethanesulfonate; a and b are each an integer from 0 to 3 provided that a+b=3; $R^5$ is a $C_1-C_6$ straight, cyclic or branched alkyl group, and R is a functionalizing group. $R^5$ may be methyl, ethyl, propyl, isopropyl, butyl, t-butyl, sec-butyl, pentyl, isopentyl, hexyl or cyclohexyl; preferably, R' is methyl.

The functionalizing group R may include alkyl, aryl, cyano, amino, diol, nitro, cation or anion exchange groups, or embedded polar functionalities. Examples of suitable R functionalizing groups include $C_1-C_{20}$ alkyl such as octyl ($C_8$) and octadecyl ($C_{18}$); alkaryl, e.g., $C_1-C_4$-phenyl; cyanoalkyl groups, e.g., cyanopropyl; diol groups, e.g., propyldiol; amino groups, e.g., aminopropyl; and embedded polar functionalities, e.g., carbamate functionalities such as disclosed in U.S. Pat. No. 5,374,755. In a preferred embodiment, the surface modifier may be a haloorganosilane, such as octyldimethylchlorosilane or octadecyldimethylchlorosilane. Embedded polar functionalities include carbamate functionalities such as disclosed in U.S. Pat. No. 5,374,755. Such groups include those of the general formula

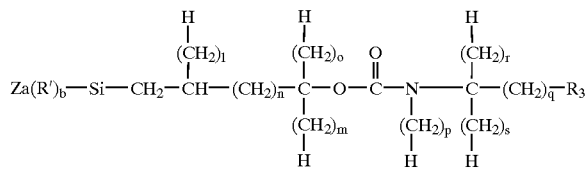

wherein 1, m, o, r, and s are 0 or 1, n is 0, 1, 2 or 3 p is 0, 1, 2, 3 or 4 and q is an integer from 0 to 19; $R_3$ is selected from the group consisting of hydrogen, alkyl, cyano and phenyl; and Z, R', a and b are defined as above. Preferably, the carbamate functionality has the general structure indicated below:

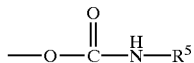

wherein $R^5$ may be, e.g., cyanoalkyl, t-butyl, butyl, octyl, dodecyl, tetradecyl, octadecyl, or benzyl. Advantageously, $R^5$ is octyl or octadecyl. In a preferred embodiment, the surface modifier may be a haloorganosilane, such as octyldimethylchlorosilane or octadecyldimethylchlorosilane. In another embodiment, the particles are surface modified by polymer coating.

A chromatographic stationary phase is said to be "end-capped" when a small silylating agent, such as trimethylchlorosilane, is used to bond residual silanol groups on a packing surface. It is most often used with reversed-phase packings and may cut down on undesirable adsorption of basic or ionic compounds. For example, end capping occurs when bonded hybrid silica is further reacted with a short-chain silane such as trimethylchlorosilane to endcap the remaining silanol groups. The goal of end capping is to remove as many residual silanols as possible. In order of decreasing reactivity, agents that can be used as trimethylsilyl donors for end capping include trimethylsilylimidazole (TMSIM), bis-N,O-trimethylsilyltrifluoroacetamide (BSTFA), bis-N,O-trimethylsilylacetamide (BSA), trimethylsilyldimethylamine (TMSDMA), trimethylchlorosilane (TMS), and hexamethyldisilane (HMDS). Preferred end-capping reagents include trimethylchlorosilane (TMS), trimethylchlorosilane (TMS) with pyridine, and trimethylsilylimidazole (TMSIM).

"Porogens" are described in Small et al., U.S. Pat. No. 6,027,643. A porogen is an added material which, when removed after the polymerization is complete, increases the porosity of a hybrid particle. The porosity should be such that it provides for a ready flow of liquids through the polymer phase while at the same time providing adequate areas of contact between the polymer and liquid phase. The porogen can be a finely divided solid which can be easily removed by dissolution in acid or base (e.g., calcium carbonate or silica), or it can be a solvent which is rejected by the polymer as it forms and is subsequently displaced by another solvent or water. Suitable liquid porogens include an alcohol, e.g., used in the manner described in *Analytical Chemistry*, Vol. 68, No.2, pp. 315–321, Jan. 15, 1996. Reverse micellular systems obtained by adding water and suitable surfactant to a polymerizable monomer have been described as porogens by Menger et al., *J Am Chem Soc* (1990) 112:1263–1264. Other examples of porogens can be founds in Li et al., U.S. Pat. No. 5,168,104 and Mikes et al., U.S. Pat. No. 4,104,209.

"Porosity" is the ratio of the volume of a particle's interstices to the volume of the particle's mass.

"Pore volume" is the total volume of the pores in a porous packing, and is usually expressed in mL/g. It can be measured by the BET method of nitrogen adsorption or by mercury intrusion, where Hg is pumped into the pores under high pressure. As described in Quinn et al. U.S. Pat. No. 5,919,368, "pore volume" can be measured by injecting acetone into beds as a total permeating probe, and subsequently a solution of $6 \times 10^6$ molecular weight polystyrene as a totally excluded probe. The transit or elution time through the bed for each standard can be measured by ultra-violet detection at 254 nm. Percent intrusion can be calculated as the elution volume of each probe less the elution volume of the excluded probe, divided by the pore volume. Alternatively, pore volume can be determined as described in Perego et al. U.S. Pat. No. 5,888,466 by $N_2$ adsorption/desorption cycles at 77° K, using a Carlo Erba Sorptomatic 1900 apparatus.

As described in Chieng et al. U.S. Pat. No. 5,861,110, "pore diameter" can be calculated from 4V/S BET, from pore volume, or from pore surface area. The pore diameter is important because it allows free diffusion of solute molecules so they can interact with the stationary phase. 60 Å and 100 Å pore diameters are most popular. For packings used for the separation of biomolecules, pore diameters>300 Å are used.

As also described by Chieng et al. in the '110 Patent, "particle surface area" can be determined by single point or multiple point BET. For example, multipoint nitrogen sorption measurements can be made on a Micromeritics ASAP 2400 instrument. The specific surface area is then calculated using the multipoint BET method, and the average pore diameter is the most frequent diameter from the log differential pore volume distribution (dV/dlog(D) vs. D Plot). The pore volume is calculated as the single point total pore volume of pores with diameters less than ca. 3000 Å.

"Particle size" may be measured, e.g., using a Beckman Coulter Multisizer 3 instrument as follows. Particles are suspended homogeneously in a 5% lithium chloride methanol solution. A greater than 70,000 particle count may be run using a 30 µm aperture in the volume mode for each sample. Using the Coulter principle, volumes of particles are converted to diameter, where a particle diameter is the equivalent spherical diameter, which is the diameter of a sphere whose volume is identical to that of the particle. Particle size can also be determined by light microscopy.

The term "aliphatic group" includes organic compounds characterized by straight or branched chains, typically having between 1 and 22 carbon atoms. Aliphatic groups include alkyl groups, alkenyl groups and alkynyl groups. In complex structures, the chains can be branched or cross-linked. Alkyl groups include saturated hydrocarbons having one or more carbon atoms, including straight-chain alkyl groups and branched-chain alkyl groups. Such hydrocarbon moieties may be substituted on one or more carbons with, for example, a halogen, a hydroxyl, a thiol, an amino, an alkoxy, an alkylcarboxy, an alkylthio, or a nitro group. Unless the number of carbons is otherwise specified, "lower aliphatic" as used herein means an aliphatic group, as defined above (e.g., lower alkyl, lower alkenyl, lower alkynyl), but having from one to six carbon atoms. Representative of such lower aliphatic groups, e.g., lower alkyl groups, are methyl, ethyl, n-propyl, isopropyl, 2-chloropropyl, n-butyl, sec-butyl, 2-aminobutyl, isobutyl, tert-butyl, 3-thiopentyl, and the like.

As used herein, the term "nitro" means $—NO_2$; the term "halogen" designates —F, —Cl, —Br or —I; the term "thiol" means SH; and the term "hydroxyl" means —OH.

The term "alicyclic group" includes closed ring structures of three or more carbon atoms. Alicyclic groups include cycloparaffins which are saturated cyclic hydrocarbons, cycloolefins and naphthalenes which are unsaturated with two or more double bonds, and cycloacetylenes which have a triple bond. They do not include aromatic groups. Examples of cycloparaffins include cyclopropane, cyclohexane, and cyclopentane. Examples of cycloolefins include cyclopentadiene and cyclooctatetraene. Alicyclic groups also include fused ring structures and substituted alicyclic groups such as alkyl substituted alicyclic groups. In the instance of the alicyclics such substituents can further comprise a lower alkyl, a lower alkenyl, a lower alkoxy, a lower alkylthio, a lower alkylamino, a lower alkylcarboxyl, a nitro, a hydroxyl, $—CF_3$, —CN, or the like.

The term "heterocyclic group" includes closed ring structures in which one or more of the atoms in the ring is an element other than carbon, for example, nitrogen, sulfur, or oxygen. Heterocyclic groups can be saturated or unsaturated and heterocyclic groups such as pyrrole and furan can have aromatic character. They include fused ring structures such as quinoline and isoquinoline. Other examples of heterocyclic groups include pyridine and purine. Heterocyclic groups can also be substituted at one or more constituent atoms with, for example, a halogen, a lower alkyl, a lower alkenyl, a lower alkoxy, a lower alkylthio, a lower alkylamino, a lower alkylcarboxyl, a nitro, a hydroxyl, $—CF_3$, —CN, or the like. Suitable heteroaromatic and heteroalicyclic groups generally will have 1 to 3 separate or fused rings with 3 to about 8 members per ring and one or more N, O or S atoms, e.g. coumarinyl, quinolinyl, pyridyl, pyrazinyl, pyrimidyl, furyl, pyrrolyl, thienyl, thiazolyl, oxazolyl, imidazolyl, indolyl, benzofuranyl, benzothiazolyl, tetrahydrofuranyl, tetrahydropyranyl, piperidinyl, morpholino and pyrrolidinyl.

The term "aromatic group" includes unsaturated cyclic hydrocarbons containing one or more rings. Aromatic groups include 5- and 6-membered single-ring groups which may include from zero to four heteroatoms, for example, benzene, pyrrole, furan, thiophene, imidazole, oxazole, thiazole, triazole, pyrazole, pyridine, pyrazine, pyridazine and pyrimidine, and the like. The aromatic ring may be substituted at one or more ring positions with, for example, a halogen, a lower alkyl, a lower alkenyl, a lower alkoxy, a lower alkylthio, a lower alkylamino, a lower alkylcarboxyl, a nitro, a hydroxyl, $—CF_3$, —CN, or the like.

The term "alkyl" includes saturated aliphatic groups, including straight-chain alkyl groups, branched-chain alkyl groups, cycloalkyl (alicyclic) groups, alkyl substituted cycloalkyl groups, and cycloalkyl substituted alkyl groups. In preferred embodiments, a straight chain or branched chain alkyl has 20 or fewer carbon atoms in its backbone (e.g., $C_1$–$C_{20}$ for straight chain, $C_3$–$C_{20}$ for branched chain), and more preferably 12 or fewer. Likewise, preferred cycloalkyls have from 4–10 carbon atoms in their ring structure, and more preferably have 4–7 carbon atoms in the ring structure. The term "lower alkyl" refers to alkyl groups having from 1 to 6 carbons in the chain, and to cycloalkyls having from 3 to 6 carbons in the ring structure.

Moreover, the term "alkyl" (including "lower alkyl") as used throughout the specification and claims includes both "unsubstituted alkyls" and "substituted alkyls", the latter of which refers to alkyl moieties having substituents replacing a hydrogen on one or more carbons of the hydrocarbon backbone. Such substituents can include, for example, halogen, hydroxyl, alkylcarbonyloxy, arylcarbonyloxy, alkoxycarbonyloxy, aryloxycarbonyloxy, carboxylate, alkylcarbonyl, alkoxycarbonyl, aminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), amidino, imino, sulfhydryl, alkylthio, arylthio, thiocarboxylate, sulfate, sulfonato, sulfamoyl, sulfonamido, nitro, trifluoromethyl, cyano, azido, heterocyclyl, aralkyl, or an aromatic or heteroaromatic moiety. It will be understood by those skilled in the art that the moieties substituted on the hydrocarbon chain can themselves be substituted, if appropriate. Cycloalkyls can be further substituted, e.g., with the substituents described above. An "aralkyl" moiety is an alkyl substituted with an aryl, e.g., having 1 to 3 separate or fused rings and from 6 to about 18 carbon ring atoms, (e.g., phenylmethyl (benzyl)).

The term "alkylamino" as used herein means an alkyl group, as defined herein, having an amino group attached thereto. Suitable alkylamino groups include groups having 1 to about 12 carbon atoms, preferably from 1 to about 6 carbon atoms. The term "alkylthio" refers to an alkyl group, as defined above, having a sulfhydryl group attached thereto. Suitable alkylthio groups include groups having 1 to about 12 carbon atoms, preferably from 1 to about 6 carbon atoms. The term "alkylcarboxyl" as used herein means an alkyl group, as defined above, having a carboxyl group attached thereto. The term "alkoxy" as used herein means an alkyl group, as defined above, having an oxygen atom attached thereto. Representative alkoxy groups include groups having 1 to about 12 carbon atoms, preferably 1 to about 6 carbon atoms, e.g., methoxy, ethoxy, propoxy, tert-butoxy and the like. The terms "alkenyl" and "alkynyl" refer to unsaturated aliphatic groups analogous to alkyls, but which contain at least one double or triple bond respectively. Suitable alkenyl and alkynyl groups include groups having 2 to about 12 carbon atoms, preferably from 1 to about 6 carbon atoms.

The term "aryl" includes 5- and 6-membered single-ring aromatic groups that may include from zero to four heteroatoms, for example, unsubstituted or substituted benzene, pyrrole, furan, thiophene, imidazole, oxazole, thiazole, triazole, pyrazole, pyridine, pyrazine, pyridazine and pyrimidine, and the like. Aryl groups also include polycyclic fused aromatic groups such as naphthyl, quinolyl, indolyl, and the like. The aromatic ring can be substituted at one or more ring positions with such substituents, e.g., as described above for alkyl groups. Suitable aryl groups include unsubstituted and substituted phenyl groups. The term "aryloxy" as used herein means an aryl group, as defined above, having an oxygen atom attached thereto. The term "aralkoxy" as used herein means an aralkyl group, as defined above, having an oxygen atom attached thereto. Suitable aralkoxy groups have 1 to 3 separate or fused rings and from 6 to about 18 carbon ring atoms, e.g., O-benzyl.

The term "amino," as used herein, refers to an unsubstituted or substituted moiety of the formula —$NR_aR_b$, in which $R_a$ and $R_b$ are each independently hydrogen, alkyl, aryl, or heterocyclyl, or $R_a$ and $R_b$, taken together with the nitrogen atom to which they are attached, form a cyclic moiety having from 3 to 8 atoms in the ring. Thus, the term "amino" includes cyclic amino moieties such as piperidinyl or pyrrolidinyl groups, unless otherwise stated. An "aminosubstituted amino group" refers to an amino group in which at least one of $R_a$ and $R_b$, is further substituted with an amino group.

This invention provides a particle for performing separations or for participating in chemical reactions, said particle having an interior area and an exterior surface, said particle having a composition represented by Formula I as set forth below:

$$[A]_y[B]_x \quad \text{(Formula I)}$$

where x and y are whole number integers and A is represented by Formula II and/or Formula III below:

$$SiO_2/(R^1{}_pR^2{}_qSiO_t)_n \quad \text{(Formula II)},$$

and/or $$SiO_2/[R^3(R^1{}_rSiO_t)_m]_n \quad \text{(Formula III)};$$

where $R^1$ and $R^2$ are independently a substituted or unsubstituted $C_1$ to $C_7$ alkyl group or a substituted or unsubstituted aryl group, $R^3$ is a substituted or unsubstituted $C_1$ to $C_7$ alkylene, alkenylene, alkynylene, or arylene group bridging two or more silicon atoms, p and q are 0, 1, or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2; and n is a number from 0.01 to 100; B is represented by Formula IV below:

$$SiO_2/(R^4{}_vSiO_t)_n \quad \text{(Formula IV)}$$

where $R^4$ is selected from the group consisting of hydroxyl, fluorine, alkoxy (e.g. methoxy), aryloxy, substituted siloxane, protein, peptide, carbohydrate, nucleic acid, and 1.5, and when v=2, t=1; and n is a number from 0.01 to 100; said interior of said particle having a composition of A, said exterior surface of said particle having a composition represented by A and B, and where said exterior composition is between about 1 and about 99% of the composition of B and the remainder including A. In the above particles, $R^4$ may be represented by:

$$-OSi(R^5)_2-R^6 \quad \text{(Formula V)}$$

where $R^5$ is selected from a group consisting of a $C_1$ to $C_6$ straight, cyclic, or branched alkyl, aryl, or alkoxy group, a hydroxyl group, or a siloxane group, and $R^6$ is selected from a group consisting of a $C_1$ to $C_{36}$ straight, cyclic, or branched alkyl (e.g. $C_{18}$, cyanopropyl), aryl, or alkoxy group, where the said groups of $R^6$ are unsubstituted or substituted with one or more moieties selected from the group consisting of halogen, cyano, amino, diol, nitro, ether, carbonyl, epoxide, sulfonyl, cation exchanger, anion exchanger, carbamate, amide, urea, peptide, protein, carbohydrate, and nucleic acid functionalities.

For attaching proteins or peptides to the surface of a silica particle, the particle may be treated with an aldehyde-containing silane reagent. MacBeath, et al. (2000) *Science* 289:1760–1763. Aldehydes react readily with primary amines on the proteins to form a Schiff base linkage. The aldehydes may further react with lysines. Alternatively, proteins, peptides, and other target molecules may be attached to the surface of the silica particle by using N-{m-{3-(trifluoromethyl)diazirin-3-yl}phenyl}-4-maleimidobutyramide which carries a maleimide function for thermochemical modification of cysteine thiols and an aryldiazirine function for light-dependent, carbene mediated binding to silica particles. Collioud, et al. (1993) *Bioconjugate* 4:528–536. Activation of a carbene-generating aryldiazirine with a 350-nm light source has been shown to lead to covalent coupling of proteins, enzymes, immunoreagents, carbohydrates, and nucleic acids under conditions such that biological activity is not impaired. Proteins or peptides can also be attached to the surface of a silica particle by derivatizing the surface silanol groups of the silica particle with 3-aminopropyl-triethoxysilane (APTS), 3-$NH_2(CH_2)_3Si(OCH_2CH_3)_3$. Han, et al. (1999) *J. Am. Chem. Soc.* 121:9897–9898.

In an example of binding a carbohydrate to the surface of a silica particle, an octagalactose derivative of calix{4}resorcarene is obtained by the reaction of lactonolactone with octaamine. Fujimoto, et al. (1997) *J. Am. Chem. Soc.* 119:6676–6677. When a silica particle is dipped into an aqueous solution of the octagalactose derivative, the resulting octagalactose derivative is readily adsorbed on the surface of the silica particle. The interaction between the octagalactose derivative and the silica particle involves hydrogen bonds. Ho Chang, et al., U.S. Pat. No. 4,029,583 describes the use of a silane coupling agent that is an organosilane with a silicon functional group capable of bonding to a silica particle and an organic functional group capable of bonding to a carbohydrate moiety.

For bonding oligonucleotides to the surface of a silica particle, the silica particle may be treated with γ-aminopropyl-triethoxysilane (APTES) to generate aminosilane-modified particles. The aminosilane-modified particles were then treated with p-nitrophenylchloroformate (NPC) (Fluka), glutaraldehyde (GA) (Sigma), maleic anhydride (MA) (Aldrich) and then treated with 5'-$NH_2$-labeled DNA or 5'-SH-labeled DNA. Yang, et al. (1998) *Chemistry Letters*, pp. 257–258. Alternatively, oligonucleotides can be added to the surface of a silica particle by reacting 3-glycoiodoxypropyltrimethoxysilane with a silica particle bearing silanol groups and then cleaving the resulting epoxide with a diol or water under acidic conditions. Maskos, et al. (1992) *Nucleic Acids Research* 20(7): 1679–1684. Oligonucleotides can also bind to the surface of a silica particle via a phosphoramidate linkage to a silica particle containing amine functionalities. For example, silica particle containing an amine functionality was reacted with a 5'-phorimidazolide derivative. Ghosh, et al. (1987) *Nucleic Acids Research* 15(13):5353–5373. A 5'-phosphorylated oligonucleotide was reacted with the amine groups in the presence of water soluble 1-ethyl-3-(3- dimethylaminopropyl)-carbodimide (EDC) in N-methylimidazole buffer. Light directed chemical synthesis can be used to attach oligonucleotides to the surface of a silica particle. To begin the process, linkers modified with photochemically removable protecting groups are attached to a solid substrate. Light is directed through a photolithographic mask to specific areas of the surface, activating those areas for chemical coupling. Lipshutz, et al. (1993) *BioTechniques* 19(3):442–447.

In an embodiment, $R^6$ may be greater than about 2.5 $\mu mol/m^2$, more preferably greater than about 3.0 $\mu mol/m^2$, and still more preferably greater than about 3.5 $\mu mol/m^2$. In a preferred embodiment, the surface concentration of $R^6$ is between about 2.5 and about 3.7 $\mu mol/m^2$.

This invention also provides a bulk material including a population of the above particles where the particles have a mean particle size of about 0.5 to 100 $\mu m$, more preferably a mean particle size of about 1 to 20 $\mu m$. In an example, the particles may have a specific surface area of about 50 to 800 $m^2/g$, more preferably about 100 to 200 $m^2/g$. In an embodiment, the particles have specific pore volumes of about 0.25 to 1.5 $cm^3/g$, more preferably about 0.5 to 1.0 $cm^3/g$. In an example, the particles of the invention may have an average pore diameter of about 50 to 500 Å, more preferably about 100 to 300 Å.

Within the scope of the invention are separation devices (e.g., chromatographic columns, filtration membranes, sample clean up devices, and microtiter plates) including the above particles. For example, a chromatographic separation may be performed by running a sample through a column containing particles of the invention.

A method of preparing chromatographic particles for performing separations or for participating in chemical reactions, including: (a) prepolymerizing a mixture of an organoalkoxysilane and a tetraalkoxysilane (e.g., tetramethoxysilane and tetraethoxysilane) in the presence of an acid catalyst to produce a polyalkoxysiloxane; (b) preparing an aqueous suspension of said polyalkoxy siloxane, said suspension further comprising a surfactant, and gelling in the presence of a base catalyst so as to produce porous particles having silicon $C_1$ to $C_7$ alkyl groups, substituted or unsubstituted aryl groups, substituted or unsubstituted $C_1$ to $C_7$ alkylene, alkenylene, alkynylene, or arylene groups; (c) modifying the pore structure of said porous particles by hydrothermal treatment; and (d) replacing one or more surface $C_1$ to $C_7$ alkyl groups, substituted or unsubstituted aryl groups, substituted or unsubstituted $C_1$ to $C_7$ alkylene, alkenylene, alkynylene, or arylene groups of the particle with hydroxyl, fluorine, alkoxy, aryloxy, or substituted siloxane groups.

In the above method, the replacing may involve reacting the hybrid particle with aqueous $H_2O_2$, KF, and $KHCO_3$ in an organic solution. In an embodiment, the molar ratio of organotrialkoxysilane to tetraalkoxysilane is about 100:1 to 0.01:1. Alkylphenoxypolyethoxyethanol may be used as surfactant in the above method. The above suspension may further include a porogen.

The porous inorganic/organic hybrid particles of the invention may have a surface concentration of silicon-methyl groups that is less than about 0.5 $\mu mol/m^2$, and a concentration of internal silicon-methyl groups such that over 10% of the internal silicons are silicon-methyl.

The porous inorganic/organic hybrid particles of the invention may have a surface concentration of the bonded phase alkyl groups that is greater than about 2.5 $\mu mol/m^2$, and a concentration of internal silicon-methyl groups such that over 10% of the internal silicons are silicon-methyl.

The surface concentration of silicon-methyl groups may be less than about 0.5 $\mu mol/m^2$, preferably between about 0.1 and about 0.5 $\mu mol/m^2$, more preferably between about 0.25 and about 0.5 $\mu mol/m^2$. The hybrid material may have a surface concentration of silanol groups greater than about 5.5 $\mu mol/m^2$, more preferably between about 5.5 and 6.8 $\mu mol/m^2$. The surface concentration of the bonded phase alkyl groups is generally greater than about 3.0 $\mu mol/m^2$, more preferably greater than about 3.5 $\mu mol/m^2$, still more preferably between about 2.5 and about 3.7 $\mu mol/m^2$. In an embodiment, the hybrid material has a concentration of internal silicon-methyl groups such that over 25% of the internal silicons are silicon-methyl The hybrid material may have a bonded phase such as $C_{18}$, $C_8$, cyanopropyl, or 3-cyanopropyl.

In an embodiment, the hybrid particles have an average pore diameter of between about 130 and about 200 Å, more preferably between about 160 and about 200 Å. The average particle size is generally between about 5 and 6 $\mu m$, more preferably about 5.4 to about 5.9 $\mu m$.

The above hybrid materials have increased stability at low pH (e.g., below 4, below 3, below 2). In a method of performing high performance liquid chromatography a sample at a pH below 3, below 4, or below 5 may be run through a column containing one of the above hybrid materials.

In another alternative embodiment, this invention pertains to a method of forming a porous inorganic/organic hybrid material comprising: (a) forming a porous inorganic/organic hybrid particle having surface silicon-methyl groups; (b) replacing one or more surface silicon-methyl groups of the hybrid particle with hydroxyl groups (e.g. by reacting the hybrid particle with $H_2O_2$, KF, and $KHCO_3$ in an organic solution); (c) bonding one or more alkyl groups to the surface of the porous inorganic/organic hybrid particle; (d) replacing one or more surface silicon-methyl groups with fluorine groups (e.g. by reacting the hybrid particle with $H_2O_2$, KF, and $KHCO_3$ in an organic solution); and (e) capping the surface of the hybrid particle with trimethylchlorosilane.

Porous inorganic/organic hybrid particles may be made as described below and in the specific instances illustrated in the Examples. Porous spherical particles of hybrid silica may, in a preferred embodiment, be prepared by a four-step process. In the first step, an organotrialkoxysilane such as methyltriethoxysilane, and a tetraalkoxysilane such as tetraethoxysilane (TEOS) are prepolymerized to form polyalkylalkoxysiloxane (PAS) by co-hydrolyzing a mixture of the two components in the presence of an acid catalyst. In the second step, the PAS is suspended in an aqueous medium in the presence of a surfactant and gelled into porous spherical particles of hybrid silica using a base catalyst. In the third step, the pore structure of the hybrid silica particles is modified by hydrothermal treatment, producing an intermediate hybrid silica product which may be used for particular purposes itself, or desirably may be further processed below. The above three steps of the process allow much better control of the particle morphology, pore volume and pore sizes than those described in the prior art, and thus provide the chromatographically-enhancing pore geometry.

In the fourth step, the remaining surface silanol groups of the hybrid silica are derivatized into organic functional groups, such as by reacting with a halopolyorganosilane such as octadecyldimethylchlorosilane. The surface of the thus-prepared material is then covered by the alkyl groups embedded during the gelation and the organic groups added during the derivatization process. The surface coverage by the overall organic groups is higher than in conventional silica-based packing materials, and subsequently the surface concentration of the remaining silanol groups in the hybrid silica is smaller. The resulting material, used as a stationary phase for LC, shows excellent peak shape for base analytes, and better hydrolytic stability than other silica-based packing materials.

Where the prepolymerization step involves co-hydrolyzing a mixture of the two components in the presence of an acid catalyst, the content of the organotrialkoxysilane can be varied, e.g., from 0.2 to 0.5 mole organotrialkoxysilane per mole of tetraalkoxysilane. The amount of the water used for the hydrolysis can be varied, e.g., from 1.10 to 1.35 mole water per mole of the silane. The silane, water and the ethanol mixture, in the form of a homogeneous solution, is stirred and heated to reflux under a flow of argon. After refluxing for a time sufficient to prepolymerize and form polyalkylalkoxysiloxane, the solvent and the side product, mainly ethanol, is distilled off from the reaction mixture. Thereafter, the residue is heated at an elevated temperature, e.g., in the range of 120 to 140° C. under an atmosphere of argon for a period of time, e.g., 1.5 to 16 h. The residue is further heated at this temperature, e.g., for 1 to 3 h under reduced pressure, e.g., $10^{-2}$–$10^{-3}$ torr, to remove any volatile species.

In the second step, the PAS is suspended into fine beads in a solution containing water and ethanol at 55° C. by agitation. The volume percent of ethanol in the solution is varied from 10 to 20%. A non-ionic surfactant such as TRITON X-100 or TRITON X-45 is added into the suspension as the suspending agent. The surfactant, having a structure of alkylphenoxypolyethoxyethanol, is believed to be able to orient at the hydrophobic/hydrophilic interface between the PAS beads and the aqueous phase to stabilize the PAS beads. The surfactant is also believed to enhance the concentration of water and the base catalyst on the surface of the PAS beads during the gelation step, through its hydrophilic groups, which induces the gelling of the PAS beads from the surface towards the center. Use of the surfactant to modulate the surface structure of the PAS beads stabilizes the shape of the PAS beads throughout the gelling process, and minimizes or suppresses formation of particles having "shell-shaped" morphology. A "shell-shaped" morphology is undesirable because it reduces mass transfer rates, leading to lower efficiencies.

The gelation step is initiated by adding the basic catalyst, e.g., ammonium hydroxide into the PAS suspension agitated at 55° C. Thereafter, the reaction mixture is agitated at the same temperature to drive the reaction to completion. Ammonium hydroxide is preferred because bases such as sodium hydroxide are a source of unwanted cations, and ammonium hydroxide is easier to remove in the washing step. The thus-prepared hybrid silica is filtered and washed with water and methanol free of ammonium ions, then dried.

In an embodiment, the pore structure of the as-prepared hybrid material is modified by hydrothermal treatment, which enlarges the openings of the pores as well as the pore diameters, as confirmed by BET nitrogen ($N_2$) sorption analysis. The hydrothermal treatment is performed by preparing a slurry containing the as-prepared hybrid material and a solution of organic base in water, heating the slurry in an autoclave at an elevated temperature, e.g., about 143 to 168° C., for a period of about 6 to 28 h. The pH of the slurry is adjusted to be in the range of about 8.0 to 9.0 using concentrated acetic acid. The concentration of the slurry is in the range of 1 g hybrid material per 4 to 10 ml of the base solution. The thus-treated hybrid material is filtered, and washed with water and acetone until the pH of the filtrate reaches 7, then dried at 100° C. under reduced pressure for 16 h. The resultant hybrid materials show average pore diameters in the range of about 100–300 Å.

The surface of hybrid silica prepared so far still contains silanol groups, which can be derivatized by reacting with a reactive organosilane. The surface derivatization of the hybrid silica is conducted according to standard methods, for example by reaction with octadecyldimethylchlorosilane in an organic solvent under reflux conditions. An organic solvent such as toluene is typically used for this reaction. An organic base such as pyridine or imidazole is added to the reaction mixture to catalyze the reaction. The thus-obtained product is then washed with water, toluene and acetone and dried at 100° C. under reduced pressure for 16 h. The resultant hybrid silica can be further reacted with a short-chain silane such as trimethylchlorosilane to endcap the remaining silanol groups, by using a similar procedure described above.

The surface of the hybrid silica particles may also be surface modified with a surface modifier, e.g., $Z_a(R')_b Si—R$, where Z=Cl, Br, I, $C_1$–$C_5$ alkoxy, dialkylamino, e.g., dimethylamino or trifluoromethanesulfonate; a and b are each an integer from 0 to 3 provided that a+b=3; R' is a $C_1$–$C_6$ straight, cyclic or branched alkyl group, and R is a functionalizing group, and by polymer coating. R' may be, e.g., methyl, ethyl, propyl, isopropyl, butyl, t-butyl, sec-butyl, pentyl, isopentyl, hexyl or cyclohexyl; preferably, R' is methyl.

The functionalizing group R may include alkyl, aryl, cyano, amino, diol, nitro, cation or anion exchange groups, or embedded polar functionalities. Examples of suitable R functionalizing groups include $C_1$–$C_{20}$ alkyl such as octyl ($C_8$) and octadecyl ($C_{18}$); alkaryl, e.g., $C_1$–$C_4$-phenyl; cyanoalkyl groups, e.g., cyanopropyl; diol groups, e.g., propyldiol; amino groups, e.g., aminopropyl; and embedded polar functionalities, e.g., carbamate functionalities such as disclosed in U.S. Pat. No. 5,374,755 and as detailed hereinabove. In a preferred embodiment, the surface modifier may be a haloorganosilane, such as octyldimethylchlorosilane or octadecyldimethylchlorosilane. Advantageously, R is octyl or octadecyl.

Polymer coatings are known in the literature and may be provided generally by polymerization or polycondensation of physisorbed monomers onto the surface without chemical bonding of the polymer layer to the support (type I), polymerization or polycondensation of physisorbed monomers onto the surface with chemical bonding of the polymer layer to the support (type II), immobilization of physisorbed prepolymers to the support (type III), and chemisorption of presynthesized polymers onto the surface of the support (type IV). see, e.g., Hanson et al., *J. Chromat.* A656 (1993) 369–380.

The current state of the art hybrid organic/inorganic based RP HPLC column packing is prepared by bonding chlorosilanes to a hybrid particle. The hybrid particle has a methyl-silicon group incorporated throughout the particle's structure, that is, the methyl group is found in both the internal framework of the hybrid silicate backbone as well as on the particle's external surface. Both the internal and external methyl groups have been shown to contribute to the hybrid's improved stability in high pH mobile phases when compared to purely silica based materials. However, the surface methyl groups also lead to lower bonded phase surface concentrations after bonding with silanes, e.g., $C_{18}$ and $C_8$ silanes, in comparison to silica phases, presumably because the methyl groups on the surface are unreactive to bonding. For example, when using low pH (e.g., about pH 5) mobile phases, a hybrid product such as XTerra™ MS $C_{18}$, which has a trifunctional $C_{18}$ bonded phase, is less stable compared to conventional silica based trifunctional $C_{18}$ bonded phases. The surface methyl groups of the hybrid particle may decrease the level of cross-bonding between adjacent $C_{18}$ ligands, essentially the methyl groups block the connection. This effect would be expected to reduce low pH stability, since the $C_{18}$ ligand has fewer covalent bonds to the surface.

The present invention provides a procedure to selectively convert surface silicon-methyl groups with silanol groups. Depending on the reaction conditions, the particle's internal framework is not disturbed or is only slightly disturbed leaving the internal methyl groups unaffected. This then results in a particle different from the original hybrid particle, where the surface now more resembles that of a pure silica particle. The particle's new composition is supported by standard analytical analysis (CHN, BET, NMR) as well as the finding that a neutral analyte, acenaphthene, is less retained under reversed-phase conditions in comparison to the unmodified hybrid particle. Presently, the modified particle is also found to be less stable under basic pH conditions, a result due to the surface methyl groups no longer being present to protect the surface. At the same time, these modified particles have been found to afford a high $C_{18}$ surface concentration after bonding with chlorosilanes, arguably due to the newly formed surface silanols being converted to ligand siloxanes. These bonded particles were found to give a 2.7 fold increase in low pH stability. The result is attributed to the high surface concentration of $C_{18}$ ligand, which then permits a higher degree of cross-bonding between adjacent $C_{18}$ ligands and hence more covalent bonds between the ligand and particle surface. Consistent with this model, peak tailing for basic analytes increased, and high pH stability decreased for the modified $C_{18}$ phase versus the standard hybrid $C_{18}$ bonded phase. Both can be attributed to the increased silanol population in the modified particle's surface.

Conversion of Surface Si—$CH_3$ Groups into Si—OH and Si—F Groups

Si—$CH_3$ groups at the surface of the hybrid particle can be converted into Si—OH and Si—F groups by the following reaction

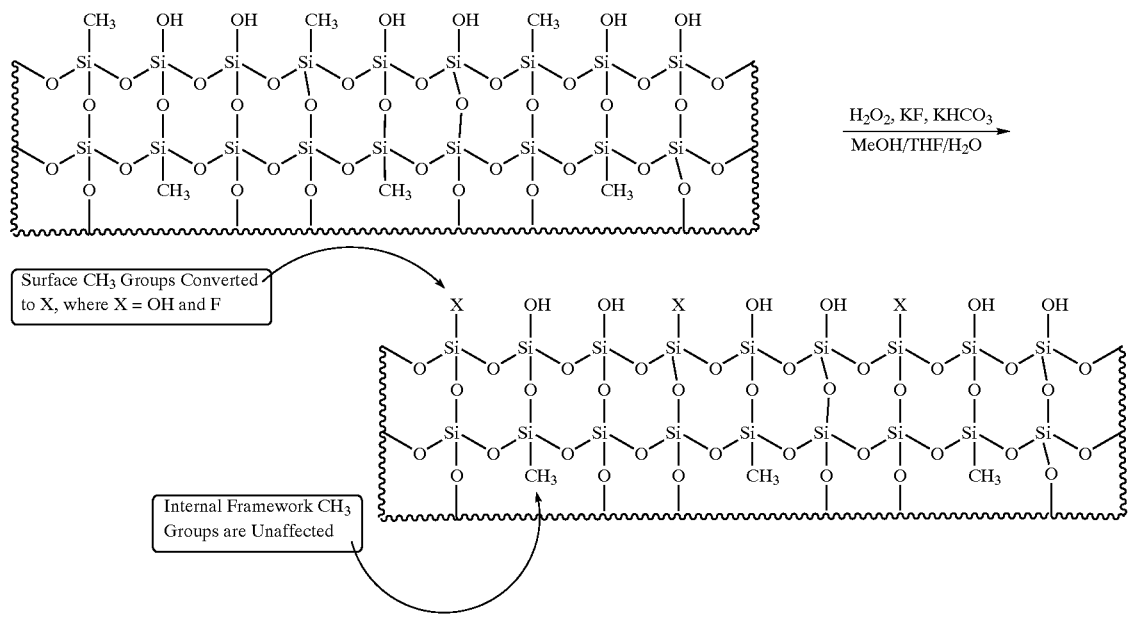

The above reaction is run in methanol/THF/water, so full wetting and total pore access should be possible. The mechanism of cleavage appears to be a modified Baeyer-Villager oxidation, which should have a minimal transition state requirement. Methyl loss may be measured by e.g. CHN combustion analysis of the reacted product, where the reduction in %C of reacted versus untreated is taken as a measure of surface methyl groups lost and hence present on the surface. IR and NMR analysis could also be used to measure this change as well as look for any other surface changes.

Other fluorinating reagents can be used in place of KF. For example, potassium hydrogen fluoride ($KHF_2$), tetrabutylammonium fluoride ($\{CH_3CH_2CH_2CH_2\}_4NF$), boron trifluoride-acetic acid complex ($BF_3$-$2\{CH_3CO_2H\}$), or boron hydrogen tetrafluoride diethyl etherate ($HBF_4$-O$(CH_2CH_3)_2$) can be used in place of KF.

Other carbonate reagents, such as sodium hydrogencarbonate, for example, can be used in place of potassium hydrogencarbonate.

Other reagents can be used in place of hydrogen peroxide ($H_2O_2$). For example, 3-chloroperoxybenzoic acid ($ClC_6H_4CO_3H$) and peracetic acid ($CH_3CO_3H$) can be used in place of hydrogen peroxide ($H_2O_2$).

Alternatively, silicon-carbon bonds can be cleaved by reacting the silicon compound with m-chloroperbenzoic acid (MCPBA) as shown below. A description of this synthesis can be found in Tamao, et al. (1982) *Tetrahedron* 39(6):983–990.

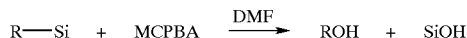

Similarly, silicon-carbon bonds can be cleaved by reacting the silicon compound with hydrogen peroxide as shown below. A description of this synthesis can be found in Tamao, et al. (1983) *Organometallics* 2:1694–1696.

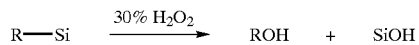

The porous inorganic/organic hybrid particles have a wide variety of end uses in the separation sciences, such as packing materials for chromatographic columns (wherein such columns will have extended lives), thin layer chromatographic (TLC) plates, filtration membranes, microtiter plates, and the like having a stationary phase which includes porous inorganic/organic hybrid particles having a chromatographically-enhancing pore geometry. The stationary phase may be introduced by packing, coating, impregnation, etc., depending on the requirements of the particular device. In a particularly advantageous embodiment, the chromatographic device is a packed chromatographic column, e.g., HPLC.

The present invention may be further illustrated by the following non-limiting examples describing the preparation of porous inorganic/organic hybrid particles, and their use.

First Series of Experiments

EXAMPLE 1

802 g of tetraethoxysilane (3.87 mol) is mixed with 137.2 g of methyltriethoxysilane (0.774 mol), 400 mol of ethanol and 108.6 of 0.1 N hydrochloric acid (~6.03 mol of water) in a flask. The resulting solution is agitated and refluxed for 16 h in an atmosphere of argon. After the ethanol in the solution is distilled off the distillation residue is heated at 140° C. for 1.5 h in the atmosphere of argon and further heated at the same temperature under reduced pressure for another 1.5 h to remove any volatile species. The thus-prepared polymethylethoxysiloxane is a colorless viscous liquid. By using a similar procedure, other polyalkylethoxysilanes are prepared. The contents of the starting materials used to prepare these products are summarized in Table 1.

TABLE 1

| Product | $R^2$ | Molar ratio of $R^2Si(OEt)_3$ to $Si(OEt)_4$ in starting mixture | Molar ratio of $H_2O$ to the sum of $R^2Si(OEt)_3$ to $Si(OEt)_4$ in starting mixture |
|---|---|---|---|
| a | methyl | 0.20 | 1.30 |
| b | methyl | 0.20 | 1.25 |
| c | methyl | 0.35 | 1.25 |
| d | methyl | 0.50 | 1.25 |
| e | ethyl | 0.25 | 1.20 |
| f | phenyl | 0.25 | 1.25 |

A mixture of 20 g of TRITON X-100 surfactant, 240 ml of ethanol and 960 mL of deionized water is heated at 55° C. for 0.5 h, leading to a solution. Under rapid agitation, 240 g of polymethylethoxysiloxane (product a in Table 1) is added into the above solution and emulsified in it. Thereafter, 150 ml of 30% $NH_4OH$ is added into the emulsion to gel the emulsion beads. Suspended in the solution, the gelled product is stirred at 55° C. for 16 h, then filtered and washed with water and methanol repeatedly, and finally dried at 100° C. under reduced pressure for 16 h. $SiO_2/[R^2SiO_{1.5}]_x$ materials derived from other polyalkylethoxysiloxanes are prepared using a similar procedure described above. The specific surface areas, specific pure volumes and the average pore diameters of these materials are measured using the multi-point $N_2$ sorption method and the data are listed in Table 2.

TABLE 2

| Product | $R^2$ | Molar ratio of $R^2SiO_{1.5}$ to $SiO_2$ in products | Specific surface area ($m^2/g$) | Pore Volume (cc/g) | Avg. Pore Diameter ("APD") (Å) |
|---|---|---|---|---|---|
| a | methyl | 0.2 | 325 | 0.45 | 49 |
| b | methyl | 0.5 | 502 | 0.43 | 36 |
| c | ethyl | 0.25 | 743 | 0.98 | 56 |
| d | methyl | 0.25 | 616 | 0.52 | 43 |

EXAMPLE 2

A mixture of 24 g of TRITON X-45 surfactant, 285 ml of ethanol and 1200 ml of deionized water is heated at 55° C. for 0.5 h, leading to a white liquid. Under rapid agitation, a solution containing 60 ml of toluene in 249 g of polymethylethoxysiloxane (product d in Table 1) is added into the ethanol/water/TRITON X-45 mixture, and emulsified in the aqueous phase. Thereafter, 190 ml of 30% $NH_4OH$ is added into the emulsion to gel the emulsion beads. Suspended in the solution, the gelled product is stirred at 55° C. for 16 h. $SiO_2/[R_2SiO_{1.5}]_x$ materials derived from other polymethylethoxysiloxanes are also prepared using a similar procedure described above. The specific surface areas, specific pore volumes and the average pore diameters of these materials are measured using the multi-point $N_2$ sorption method and the data are presented in Table 3.

TABLE 3

| Product | $R^2$ | Molar ratio of $R^2SiO_{1.5}$ to $SiO_2$ in products | Ratio of toluene to Polymethyl-ethoxysilane (ml/g) | Specific surface area ($m^2/g$) | Pore Volume (cc/g) | Avg. Pore Diameter (Å) |
|---|---|---|---|---|---|---|
| a | methyl | 0.5 | 0.24 | 689 | 0.93 | 43 |
| b | methyl | 0.5 | 0.12 | 644 | 0.73 | 39 |
| c | methyl | 0.35 | 0.12 | 466 | 0.81 | 60 |
| d | methyl | 0.2 | 0.12 | 358 | 0.72 | 72 |

EXAMPLE 3

13 g of product a from Table 2 is mixed with 130 mL of 0.1M tris(hydroxymethyl)aminomethane in water, yielding a slurry. The pH of the slurry is adjusted to 8 by adding concentrated acetic acid. The resultant slurry is then enclosed in a stainless autoclave and heated at 143° C. for 20 h. After the autoclave cools down to room temperature the product is filtered and washed repeatedly using water and acetone, and then dried at 100° C. under reduced pressure for 16 h. Hydrothermal treatment of other hybrid silica materials is also carried out using a similar procedure described above. The specific surface areas, specific pore volumes and the average pore diameters of these materials are measured using the multi-point $N_2$ sorption method and the data are listed in Table 4.

TABLE 4

| Product | Composition of the Hybrid Materials | N$_2$ sorption Data (as-prepared) | | | N$_2$ sorption Data (after hydrothermal treatment) | | | Conditions of Hydrothermal Treatment | | |
|---|---|---|---|---|---|---|---|---|---|---|
| | | SSA (m$^2$/g) | SPV (cc/g) | APD (Å) | SSA (m$^2$/g) | SPV (cc/g) | APD (Å) | pH | T (° C.) | t (h) |
| a | SiO$_2$/(CH$_3$SiO$_{1.5}$)$_{0.2}$ | 325 | 0.45 | 49 | | | | | | |
| a1 | | | | | 130 | 0.41 | 103 | 8.0 | 143 | 20 |
| b | SiO$_2$/(CH$_3$SiO$_{1.5}$)$_{0.2}$ | 358 | 0.72 | 72 | | | | | | |
| b1 | | | | | 151 | 0.71 | 159 | 8.1 | 143 | 20 |
| b2 | | | | | 135 | 067 | 173 | 8.4 | 155 | 20 |
| c | SiO$_2$/(CH$_3$SiO$_{1.5}$)$_{0.35}$ | 466 | 0.81 | 60 | | | | | | |
| c1 | | | | | 160 | 0.72 | 139 | 8.0 | 143 | 20 |
| d | SiO$_2$/(CH$_3$SiO$_{1.5}$)$_{0.5}$ | 689 | 0.93 | 43 | | | | | | |
| d1 | | | | | 225 | 0.90 | 123 | 8.30 | 143 | 20 |
| d | SiO$_2$/(CH$_3$SiO$_{1.5}$)$_{0.5}$ | 729 | 0.76 | 38 | | | | | | |
| d1 | | | | | 188 | 0.70 | 125 | 8.30 | 143 | 20 |
| d2 | | | | | 155 | 0.69 | 148 | 8.75 | 148 | 20 |
| d3 | | | | | 125 | 0.62 | 168 | 9.0 | 163 | 20 |
| e | SiO$_2$/(C$_2$H$_5$SiO$_{1.5}$)$_{0.25}$ | 743 | 0.98 | 56 | | | | | | |
| e1 | | | | | 267 | 0.94 | 139 | 8.28 | 143 | 20 |
| f | SiO$_2$/(C$_6$H$_5$SiO$_{1.5}$)$_{0.25}$ | 616 | 0.52 | 43 | | | | | | |
| f1 | | | | | 327 | 0.52 | 80 | 8.43 | 143 | 20 |

EXAMPLE 4

The particles of hybrid silica prepared according to Example 3 are sized to ~5 μm. The surfaces of the particles are modified with octadecyldimethylchlorosilane (ODS) and trimethylchlorosilane as follows, 4.5 g ODS and 1.32 g imidazole are added to a mixture of 8 g of hybrid silica (product a1 in Table 4) in 90 ml of toluene and the resultant mixture is refluxed for 2 h. The modified hybrid silica particles are filtered and washed successively with water, toluene, 1:1 acetone/water and acetone, and then dried at 100° C. under reduced pressure for 16 h. The surface coverage of octadecyl groups is determined to be 2.74 μmol/m$^2$ based on elemental analyses.

Trimethylchlorosilane (1.65 g) and imidazole (1.32 g) are added to a mixture of the above ODS-modified hybrid silica in 65 ml of toluene and the resultant mixture is refluxed for 4 h. The thus-modified hybrid silica particles are filtered and washed successively with water, toluene, 1:1 acetone/water and acetone, and then dried at 100° C. under pressure for 16 h. Surface modification of other hybrid silica is also carried out using a similar procedure described above. The specific surface area, specific pore volume, ODS surface coverage and average pore diameter data for these materials are listed in Table 5.

TABLE 5

| Product | Composition of the base hybrid silica | Specific surface area (m$^2$/g) | Pore Volume (cc/g) | Avg. Pore Diameter (Å) | Surface coverage of ODS (μmol/m$^2$) |
|---|---|---|---|---|---|
| A | SiO$_2$/(CH$_3$SiO$_{1.5}$)$_{0.2}$ | 130 | 0.41 | 103 | 2.73 |
| b | SiO$_2$/(CH$_3$SiO$_{1.5}$)$_{0.35}$ | 173 | 0.73 | 140 | 2.50 |
| c | SiO$_2$/(CH$_3$SiO$_{1.5}$)$_{0.5}$ | 177 | 0.61 | 113 | 2.18 |
| d | SiO$_2$/(CH$_3$SiO$_{1.5}$)$_{0.5}$ | 225 | 0.90 | 123 | 2.15 |

The above derivatized hybrid silica is used for separation of a mixture of neutral, polar and basic compounds listed in Table 6. The chromatographic columns are packed using a slurry packing technique, and the analysis conditions are shown in Table 7.

TABLE 6

| | Product b in Table 5 | Product c in Table 5 | Product d in Table 5 |
|---|---|---|---|
| k' of Acenaphthene | 10.02 | 11.35 | 13.40 |
| Relative Retention (r) | | | |
| Propranolol/Acenaphthene | 0.157 | 0.149 | 0.139 |
| Butyl paraben/Acenaphthene | 0.226 | 0.216 | 0.223 |
| Dipropyl Phthalate/Acenaphthene | 0.411 | 0.405 | 0.403 |
| Naphthalene/Acenaphthene | 0.437 | 0.436 | 0.437 |
| Amitriptyline/Acenaphthene | 1.483 | 1.525 | 1.395 |
| USP Tailing Factor | | | |
| Amitriptyline | 1.06 | 1.41 | 1.41 |
| Propranolol | 0.98 | 0.98 | 0.98 |

TABLE 7

| | |
|---|---|
| Temperature | 23° C. |
| Mobile phase | 35% v/v 20.0 mM K$_2$HPO$_4$ pH 7.00/65% methanol |
| Flow rate | 1.4 ml/min |

The hydrolytic stability of the columns packed by the hybrid silica shown in Table 5, as well as some commercial columns based on silica gel bonded with octadecyl groups are evaluated using the following procedure. The columns are placed in a 50° C. water bath and flushed with a solution of 50 mM triethylamine buffer (pH 10) in water. Acenaphthene is injected at a flow rate of 1 ml/min at predetermined intervals and the theoretical plate numbers are recorded.

The lifetime of the column is defined as the time when the plate number drops to 50% of the initial value. The results are shown in Table 8.

TABLE 8

| Column | Lifetime (h) |
|---|---|
| Commercial Column A ($C_{18}$ type) | 8 |
| Commercial Column B ($C_{18}$ type) | 11 |
| Commercial Column C ($C_{18}$ type) | 16 |
| Commercial Column D ($C_{18}$ type) | 19 |
| Commercial Column E ($C_{18}$ type) | 30 |
| Commercial Column F ($C_{18}$ type) | 34 |
| Packing Material of Product c in Table 5 | 48 |
| Packing Material of Product d in Table 5 | 50 |
| Packing Material of Product a in Table 5 | 51 |

It can be seen that the durability of the packing materials based on the hybrid silica is greatly improved over the commercial silica gels.

Second Series of Experiments

EXAMPLE 5

Removal of a Trifunctional Bonded Phase from a Silica Surface as a Model Study for The Impact of the Reaction Conditions on Particle Framework The Tamao-Kumada conditions used to cleave bonded phases from silica particles as described by Yang and Li (*Anal. Chem.* 1998, 70, 2827–2830) gave high recoveries of the cleaved alkyl ligand, but they did not describe any effects on the silica particle's framework and surface. A trifunctional butyl bonded phase was reacted following the conditions of Yang and Li. The cleaved particles were recovered, filtered, and then washed four consecutive times with water (50 mL/g). The washed particles were then stirred in 1.0 M hydrochloric acid (25 mL/g) at 98° C. for 16 hours to hydrolyze methoxy groups that had condensed with silanols during the methyl group cleavage reaction. Upon cooling, the acid washed particles were filtered and washed four consecutive times with water (10 mL/g) until the wash slurry pH was equal to the pH of the deionized water. The particles were then washed with acetone (50 mL/g) and then dried at 80° C. for 16 hours under reduced pressure.

The %C, specific surface area, specific pore volume, average pore diameter, and particle size was compared to the original virgin silica particles before bonding using combustion analysis, multipoint $N_2$ sorption, and Coulter counter respectively. Comparative data are listed in Table 9. The conditions used by Yang and Li appear to slightly increase the particle's pore diameter, but no increase in surface area was observed experimentally. As reported by Yang and Li, complete ligand cleavage was observed as measured by a %C decrease back to a level experimentally equivalent to the silica particle before bonding. Particle size was unaffected by the process as determined by Coulter measurement.

TABLE 9

| Material | % C | Specific Surface Area ($m^2$/g) | Pore Volume (cc/g) | Avg. Pore Diameter (Å) | Particle Size 50% Point (μm) | Particle Size Ratio (90%/10%) |
|---|---|---|---|---|---|---|
| Silica Particle A before Bonding | 0.10 | 111 | 0.72 | 237 | 4.82 | 1.54 |
| Silica Particle After Bonding | 1.88 | — | — | — | 4.92 | 1.51 |

TABLE 9-continued

| Material | % C | Specific Surface Area ($m^2$/g) | Pore Volume (cc/g) | Avg. Pore Diameter (Å) | Particle Size 50% Point (μm) | Particle Size Ratio (90%/10%) |
|---|---|---|---|---|---|---|
| Silica Particle after Bonded Phase Cleavage | 0.16 | 113 | 0.75 | 258 | 4.91 | 1.52 |

EXAMPLE 6

Conversion of Surface Methyl Groups on Hybrid Inorganic/Organic Particles

Reagent concentration was studied for its effect on hybrid particle methyl group conversion efficiency as well as impact on the particle's framework.

Mixtures of 5 μm methyl hybrid particle (Waters Corporation, Milford, Mass.), potassium fluoride (Aldrich Chemical, Milwaukee, Wis.), potassium hydrogen carbonate (Aldrich Chemical, Milwaukee, Wis.), hydrogen peroxide solution (30 wt. % in water, Aldrich Chemical, Milwaukee, Wis.), and a 1:1 v/v mixture of methanol/tetrahydrofuran (HPLC grade, J.T. Baker, Phillipsburgh, N.J.) were heated with stirring to 60° C. for 16 hours. Upon cooling the modified particles were filtered and washed four consecutive times with water (30 mL/g). The specific amounts of reagents are listed for each reaction in Table 10 below. The washed particles were then stirred in 1.0 M hydrochloric acid (25 mL/g) at 98° C. for 16 hours to hydrolyze methoxy groups that had condensed with silanols during the methyl group cleavage reaction. Upon cooling, the acid washed particles were filtered and washed four consecutive times with water (10 mL/g) until the wash slurry pH was equal to the pH of the deionized water. The particles were then washed with acetone (15 mL/g) and then dried at 80° C. for 16 hours under reduced pressure. The %C and %F, specific surface areas, specific pore volumes, average pore diameters, and particle sizes for these materials were measured by combustion analyses, multipoint $N_2$ sorption, and Coulter counter (volume mode) respectively. Characterization data is listed in Table 11.

TABLE 10

| Product | Starting Hybrid Particle Lot No. | Starting Hybrid Particle (g) | Potassium Fluoride (g) | Potassium Hydrogen-carbonate (g) | Hydrogen Peroxide Solution (g) | Methanol/Tetrahydrofuran (mL) |
|---|---|---|---|---|---|---|
| AA | A | 30.0 | 3.28 | 5.69 | 9.67 | 1200 |
| BB | B | 30.0 | 4.90 | 8.50 | 14.5 | 1200 |
| CC | A | 30.0 | 6.57 | 11.39 | 19.4 | 1200 |
| DD | A | 30.0 | 6.57 | 11.39 | 19.4 | 1200 |
| EE | A | 30.0 | 13.14 | 22.70 | 38.7 | 1200 |
| FF | A | 2.0 | 1.78 | 3.10 | 5.2 | 100 |
| GG | CC | 11.0 | 2.15 | 3.75 | 6.4 | 440 |

At high concentrations of reagents in the methanol/tetrahydrofuran solvent blend, the salts precipitated out of solution, making exact correlations between reagent charge and final particle properties inexact. At the highest concentration of reagents used (FF), the particles began to fracture as evidenced by the increase in the 90%/10% ratio of the product's particle size. At the intermediate concentrations of reagents (CC, DD, EE), the particles appear to be pore enlarged as evidenced by an increase in the average pore diameter. The concentrations of reagents used in BB appear to only have slightly affected the particle's pore diameter, but an increase in surface area was observed. For the least concentrated reaction, AA, the particle's framework appears to be unaffected based on surface area and pore diameter. Carbon loss was measured for all examples. The %C appears to level off at ca. 6.15%, despite the increasing reagent concentration (AA→DD) and evidence for some framework change. As a whole, the data suggest that approximately 0.63% of the particle's total original 6.80% (avg. of A+B) carbon content is on the surface where it is accessible to the oxidation reagents. Example GG also supports that reagent concentrations used in CC and DD may be affecting the particle framework to only a slight degree. In this example, the particles used to make CC were reacted with a second treatment at the same reagent concentration. The %C of the particle dropped to 5.78, but the surface area and pore diameter were slightly affected relative to CC. As an upper limit, this data point would suggest 1.00% of the particle's total original 6.80% (avg. of A+B) carbon content is on the surface where it is accessible to the oxidation reagents. Analysis of all the samples by $^{29}$Si CP/MAS NMR spectroscopy show only decreases in the methylsilicon peak relative to the silicon oxide peaks. No other carbon containing species were identified by $^{13}$C CP/MAS NMR after acid washing. Prior to acid washing, Si—OCH$_3$ peaks were observed, which are hydrolyzed during the acid wash step. Significant amounts of fluorine incorporation were observed as measured by the combustion/ISE method (Galbraith Laboratories, Inc., Knoxville, Tenn.), however, the weight of a fluorine atom (19 g/mol) is similar to the weight of a hydroxy group and would not have a significant impact on the %C combustion measurement. While not detected by $^{29}$Si NMR, Si—F bonds may be formed during the course of the reaction.

R.; Landais, Y. Tetrahedron 1996, 52(22), 7599–7662] that is used here indicated that potassium fluoride might not be necessary to achieve surface methyl group conversion. Reduced KF equivalents were studied for particle methyl group cleavage efficiency. Reactions were run as described in Example 6. The specific amounts of reagents are listed for each reaction in Table 12, and characterization data is listed in Table 13. The objective of the experiment was to see if lower amounts of potassium fluoride (relative to the potassium hydrogencarbonate and hydrogen peroxide) would still afford methyl group conversion into hydroxyl groups, and if so, with reduced fluorine incorporation into the final particle.

TABLE 12

| Product | Starting Hybrid Particle Lot No. | Starting Hybrid Particle (g) | Potassium Fluoride (g) | Potassium Hydrogen-carbonate (g) | Hydrogen Peroxide Solution (g) | Methanol/Tetrahydrofuran (mL) |
|---|---|---|---|---|---|---|
| HH | A | 5 | 0.33 | 0.95 | 1.61 | 200 |
| II | A | 5 | 0.66 | 0.95 | 1.61 | 200 |

TABLE 11

| Starting Particle or Product | % C | Fluorine (ppm) | Specific Surface Area (m$^2$/g) | Pore Volume (cc/g) | Avg. Pore Diameter (Å) | Particle Size 50% Point (μm) | Particle Size Ratio (90%/10%) |
|---|---|---|---|---|---|---|---|
| Hybrid A | 6.78 | <20 | 178 | 0.66 | 130 | 5.59 | 1.49 |
| Hybrid B | 6.83 | <18 | 186 | 0.69 | 131 | 5.27 | 1.60 |
| AA | 6.40 | 900 | 182 | 0.65 | 131 | 5.53 | 1.52 |
| BB | 6.13 | 1170 | 212 | 0.74 | 138 | 5.18 | 1.59 |
| CC | 6.16 | — | 159 | 0.72 | 162 | 5.53 | 1.55 |
| DD | 6.14 | 5000 | 152 | 0.70 | 163 | 5.46 | 1.52 |
| EE | 5.25 | 1500 | 222 | 0.83 | 149 | 5.84 | 1.61 |
| FF | 2.22 | — | 153 | 0.56 | 200 | 5.67 | 3.60 |
| GG | 5.78 | — | 157 | 0.72 | 178 | 5.39 | 1.54 |

EXAMPLE 7

Conversion of Surface Methyl Groups on Hybrid Inorganic/Organic Particles with Reduced Equivalents of Potassium Fluoride in the Reaction Solution Reviews on the Tamao-Kumada oxidation (i) Tamao, K. Advances in Silicon Chemistry 1996, 3, 1–62; ii) Jones, G.

TABLE 13

| Starting Particle or Product | % C | Fluorine (ppm) | Specific Surface Area (m²/g) | Pore Volume (cc/g) | Avg. Pore Diameter (Å) | Particle Size 50% Point (μm) | Particle Size Ratio (90%/10%) |
|---|---|---|---|---|---|---|---|
| Hybrid A | 6.78 | <20 | 178 | 0.66 | 130 | 5.59 | 1.49 |
| HH | 6.37 | 338 | 179 | 0.73 | 132 | 5.49 | 1.55 |
| II | 6.43 | 527 | 215 | 0.72 | 133 | 5.49 | 1.54 |

Fluorine incorporation into the particle was reduced by using the fewer equivalents (mol/mol) of potassium fluoride relative to potassium hydrogencarbonate. At the same time, the reduction in %C was not as great as for examples where the molar ratio of the two salts were equivalent.

EXAMPLE 8

Chromatographic Evaluation of Surface Methyl Converted Hybrid Inorganic/Organic Particles Particles from Example 6 were used to separate a mixture of neutral (naphthalene, acenaphthene) and polar basic (propranolol, amitriptyline) compounds (void volume marker—uracil) under reversed-phase (RP) conditions. Chromatographic columns were prepared by slurry packing the materials into 4.6×150 mm steel columns, and the analysis conditions were as follows: temperature 23° C.; Mobile Phase: 65/35 v/v methanol/20.0 mM $K_2HPO_4$/$KH_2PO_4$, pH 7.00; Flow Rate: 1.4 mL/min. Results are shown in Table 14.

TABLE 14

| | Retention Time (min) | | | | |
|---|---|---|---|---|---|
| Product | Uracil | Naphthalene | Acenaph-thene | Propranolol | Ami-triptyline |
| Hybrid A | 1.36 | 1.62 | 1.65 | 1.67 | 2.27 |
| AA | 1.38 | 1.55 | 1.54 | 1.98 | 2.61 |
| CC | 1.37 | 1.47 | 1.47 | 1.91 | 2.49 |
| DD | 1.38 | 1.46 | 1.46 | 1.72 | 2.33 |
| GG | 1.37 | — | 1.42 | 2.05 | 2.52 |

The chromatographic data in Table 14 support the conversion of surface Si—$CH_3$ groups into Si—OH or Si—F groups. The methyl groups on the surface of Hybrid A act as a stationary phase for the retention of all the analytes. As the methyl groups are converted, the neutral analytes show a reduction in retention, moving to the void volume. The basic compounds, propranolol and amitriptyline, are in an ionized state at pH 7, and are retained by both reversed-phase (RP) (with the methyls) and ion exchange (with silanols) modes of surface interaction. For the methyl group converted particles, a higher surface concentration of silanols is present and is expected to give more retention for the bases, as is observed.

The impact of replacing the surface methyl substituents with hydroxyl or fluorine substituents was also studied for stability of the particles towards alkaline mobile phases. Chromatographic columns were prepared by slurry packing the materials into 4.6×150 mm steel columns, and the analysis conditions were as follows: 1) The plate number, N, (5 sigma method) was measured for a test analyte, uracil. Mobile phase conditions were acetonitrile-20 mM $KH_2PO_4$/$K_2HPO_4$ pH 7.00 (40:60, v/v) at a flow of 1.0 mL/min and a column temperature of 50.0° C. 2) The column was purged over to and run for 15 min in a 50 mM triethylamine pH 10.00 mobile phase at a flow of 2.0 mL/min and a column temperature of 50.0° C. 3) In 15 min increments, the column was purged with 100% water (10 minutes at 2.0 mL/minute) and then purged with 100% methanol (10 minutes at 2.0 mL/minute). 4) Next, the column was purged over to and equilibrated in the mobile phase of step 1 above, and N for uracil was measured. 5) The process was then repeated starting at step 2. Packed columns were kept in a 50° C. water bath throughout the test. Column lifetime is defined as the time of exposure to the pH 10 triethylamine solution when the efficiency of the column drops to 50% of its initial value. Silica sample A from Example 5 is included in the test results of Table 15 for comparison.

TABLE 15

| Product | Lifetime (h) |
|---|---|
| Silica A | 3.0 |
| Hybrid A | 5.0 |
| AA | 5.8 |
| CC | 3.8 |
| GG | 3.8 |

The data show that conversion of the surface methyl groups has a moderately negative impact on particle stability in an alkaline mobile phase within experimental error. The methyl groups located in the hybrid particle's framework do appear to contribute towards the high pH stability of the hybrid particles, because the surface converted particles still show better stability than a silica particle (Silica A).

EXAMPLE 9

Modification of Surface Methyl Group Converted Hybrid Inorganic/Organic Particles with Octadecyltrichlorosilane (ODS) and Chlorotrimethylsilane (TMS)

Samples from Example 6 were modified on a 0.75–20 g scale with octadecyltrichlorosilane (ODS) and chlorotrimethylsilane (TMS). As a control, virgin hybrid particles A from Example 6 were also bonded. Specific reagent amounts are provided in Table 8. The general procedure is as follows. Methyl group cleaved hybrid particle, ODS, and imidazole are refluxed in dry toluene for 2.75–4.0 hours. The ODS modified particles are filtered and washed successively with toluene, acetone, 1:1 v/v acetone/water, and acetone. The washed particles were then heated in a 4.5:1 v/v solution of acetone/0.12 M ammonium acetate for 2.0–3.0 hours at 60° C., and subsequently cooled, filtered and washed successively with 1:1 v/v acetone/water, and acetone, and then dried at 80° C. under reduced pressure for 16 h. The surface concentrations of the octadecyl groups were determined from elemental analyses.

TMS end capping of the ODS derivatized samples was accomplished as follows, ODS modified particles, TMS, and imidazole were refluxed in dry toluene for 4.0 hours. The end capped particles were filtered and washed successively with toluene, acetone, 1:1 v/v acetone/water, and acetone, and then dried at 80° C. under reduced pressure for 16 h. Specific reagent amounts are provided in Table 16. ODS surface concentrations and total (ODS+TMS) carbon data are listed in Table 17.

TABLE 16

| Product | Methyl Group Cleaved Hybrid Particle | Starting Particle (g) | ODS (g) | Imidazole (g) | End Cap TMS (g) | End cap Imidazole (g) |
| --- | --- | --- | --- | --- | --- | --- |
| JJ | Hybrid A | 20.0 | 14.0 | 3.1 | 3.9 | 3.1 |
| KK | AA | 20.0 | 14.1 | 3.0 | 3.9 | 3.0 |
| LL | CC | 11.0 | 6.8 | 1.5 | 1.9 | 1.5 |
| MM | GG | 0.74 | 0.5 | 0.1 | 0.1 | 0.1 |

TABLE 17

| Product | ODS Surface Concentration ($\mu mol/m^2$) | Total % C |
| --- | --- | --- |
| JJ | 2.33 | 15.5 |
| KK | 2.65 | 16.0 |
| LL | 2.81 | 14.7 |
| MM | not determined | 15.1 |

The higher ODS surface concentrations achieved for KK and LL relative to the control, JJ, support that surface methyl groups were converted into hydroxyl groups as predicted by the Tamao-Kumada reaction mechanism. These results show that surface methyl group converted hybrid particles allow for higher surface concentrations or loadings of a desired bonded phase ligand compared to existing hybrid particles. Higher bonded phase loadings can be advantageous, for example, in ion exchange chromatography. On a silica particle of similar surface area, pore volume, and pore diameter, an even higher ODS surface concentration would be expected (3.2–3.5 $\mu mol/m^2$). The failure to achieve these surface concentrations in the present case can be explained by some methyl groups or silanol groups being replaced with fluorine atoms, which are not reactive with chlorosilanes.

EXAMPLE 10

Chromatographic Evaluation of ODS/TMS Modified Surface Methyl Converted Hybrid Inorganic/Organic Particles ODS/TMS modified particles from Example 9 were used to separate a mixture of neutral, polar, and basic compounds (void volume marker—uracil) under reversed-phase (RP) conditions. Chromatographic columns were prepared by slurry packing the materials into 3.9×150 mm steel columns, and the analysis conditions were as follows: temperature 23° C.; mobile phase: 65/35 v/v methanol/20.0 mM $K_2HPO_4$/$KH_2PO_4$, pH 7.00; flow rate: 1.4 mL/min. Results are shown in Tables 18 and 19.

TABLE 18

| | Capacity Factor (k) | | | | |
| --- | --- | --- | --- | --- | --- |
| Product | Propranolol | Butyl Paraben | Naphthalene | Acenaphthene | Amitriptyline |
| JJ | 1.63 | 2.75 | 5.47 | 12.23 | 16.88 |
| KK | 1.63 | 2.84 | 6.05 | 13.82 | 18.98 |
| LL | 1.59 | 2.45 | 5.60 | 13.02 | 23.99 |

TABLE 19

| | USP Tailing Factor | | | | |
| --- | --- | --- | --- | --- | --- |
| Product | Propranolol | Naphthalene | Acenaphthene | Butyl Paraben | Amitriptyline |
| JJ | 1.2 | 1.5 | 1.4 | 1.1 | 1.8 |
| KK | 1.2 | 1.2 | 1.2 | 1.1 | 2.0 |
| LL | 1.4 | 1.3 | 1.3 | 1.2 | 2.3 |

Retention and USP tailing factors are generally similar to the control hybrid particle bonded phase. However, the basic analyte, amitriptyline, has larger capacity and tailing factors on the surface methyl group converted ODS phases. These two changes support that additional silanol groups were introduced onto the hybrid particle surface via oxidative cleavage of the Si—$CH_3$ groups (McCalley, D. V. *J. Chromatogr. A* 1996, 738, 169–179).

The ODS/TMS modified hybrid samples of Example 9 were also studied for hydrolytic stability in both alkaline and acidic mobile phases. The alkaline stability procedure was the same as described in Example 8, except the mobile phase of step 1 was changed to MeOH-20 mM $K_2HPO_4$/$KH_2PO_4$, pH 7.00 (65/35, v/v), the marker was changed to acenaphthene, and 60 min increments were used in step 3 of the procedure. Hydrolytic stability in an acidic mobile phase at 80° C. was measured using the following protocol. 1) The column (3.9×20 or 4.6×75 mm) was equilibrated to temperature for two hours running at 1.0 mL/min with acetonitrile. At the end of the equilibration time, acetone was injected to measure the void volume. 2) The column was then equilibrated at 1.0 mL/min in acetonitrile:water (1:1, v/v), and acenaphthene (with uracil as a void volume marker) was injected to obtain a retention factor. 3) The column was equilibrated for one hour in 1% trifluoroacetic acid in water (pH 1.02) at 1.4 mL/min. An injection of ethyl paraben was made with a 90 minute runtime, and then an injection of benzene and toluene was made, also with a 90 minute runtime. 4) Any hydrolyzed bonded phase was then eluted using 1% trifluoroacetic acid in acetonitrile at 3.0 mL/min for 24 minutes. 5) Steps 3 and 4 were repeated until the retention time for ethyl paraben in step three was reduced to less than 50% of its original value. After every ten cycles of steps three and four, steps 1 and 2 were repeated. The lifetime is defined as the time of exposure to the 1% trifluoroacetic acid/water mobile phase when the ethylparaben retention time was reduced to less than 90% of its original value. Stability results are shown in Table 20. For reference, a number of commercially available silica gel based ODS columns are included with the control hybrid column, JJ.

TABLE 20

| Product | Acidic Lifetime (h) | Alkaline Lifetime (h) |
|---|---|---|
| Inertsil ODS3 | 13 | 23 |
| Phenomenex Luna $C_{18}$ (2) | 5 | 23 |
| Symmetry $C_{18}$ | 13 | 17 |
| YMC ODS AQ | 5 | 8 |
| Zorbax SB-$C_{18}$ | 117 | 7 |
| JJ | 5 | 39 |
| KK | 9 | 32 |
| LL | 9 | 26 |
| MM | 65 | — |

In comparison to commercial ODS modified silica based column packings, the ODS/TMS bonded hybrid control column packing (JJ) has a significantly longer lifetime under alkaline conditions, but a generally shorter lifetime under acidic mobile phase conditions. The ODS/TMS modified surface methyl converted particles of the present invention were found to have significantly improved (1.8 to 13 fold increase) acidic lifetimes over the control, JJ. Therefore, increased amounts of methyl to hydroxyl and/or fluorine group conversion on the unbonded particle appear to afford increased acid stability on the subsequent ODS/TMS bonded phases. In comparison to commercially available ODS modified silica gel based packings, the ODS/TMS modified surface methyl group converted particles were found to have an intermediate lifetimes at low pH. At the same time, the ODS/TMS modified surface methyl group converted particles still had similar or better alkaline lifetimes compared to the silica gel ODS phases. This alkaline stability is unique to these hybrid particles and is attributed to the methyl groups remaining in the internal framework which inhibit framework hydrolysis at alkaline pH.

EXAMPLE 11

Modification of Surface Methyl Group Converted Hybrid Inorganic/Organic Particles with (3-cyanopropyl)trichlorosilane (CN)

Samples from Examples 2 were modified on a 10–50 g scale with (3-cyanopropyl)trichlorosilane (CN). A control CN phase (NN) was also prepared on virgin hybrid particle A from Example 6. Specific reagent amounts are provided in Table 21. The general procedure is as described in Example 9. The surface concentrations of the cyanopropyl groups were determined from elemental analyses and are shown Table 21.

TABLE 21

| Product | Methyl Group Cleaved Hybrid Particle | Starting Particle (g) | CN (g) | Imidazole (g) | CN Surface Concentration ($\mu$mol/m$^2$) | Total % C |
|---|---|---|---|---|---|---|
| NN | Hybrid A | 50.0 | 18.2 | 7.7 | 2.31 | 8.73 |
| OO | DD | 20.0 | 5.6 | 2.3 | 3.10 | 9.03 |
| PP | BB | 20.0 | 6.2 | 2.5 | 3.70 | 8.65 |

The higher CN surface concentrations achieved for PP and OO relative to the control, NN, support that surface methyl groups were cleaved and replaced with silanols as predicted by the Tamao-Kumada reaction mechanism. As in the case for the ODS results, the CN data shows that surface methyl group converted hybrid particles allow for higher surface concentrations or loadings of a desired bonded phase ligand compared to the existing hybrid particles. On a purely silica particle, a higher CN surface concentration would be expected (4.0–4.9 $\mu$mol/m$^2$). The failure to achieve these surface concentrations in the present case may again be explained by some methyl or hydroxy groups being replaced with fluorine atoms, which are not reactive with (3-cyanopropyl)trichlorosilane. Note the higher of the two CN surface concentrations was achieved on the unbonded particle having the lower fluorine content (1170 ppm vs. 5000 ppm)

EXAMPLE 12

Chromatographic Evaluation of CN Modified Surface Methyl Converted Hybrid Inorganic/Organic Particles CN modified particles from Example 11 were used to separate a mixture of neutral, polar, and basic compounds (void volume marker—uracil) under reversed-phase (RP) conditions. Chromatographic columns were packed and tested as described in Example 10. Data for two commercially available CN modified silica columns is included for reference. Results are shown in Tables 22 and 23. Silica based CN columns typically have long retention times for basic analytes in comparison to neutral analytes, as a consequence of the reduced hydrophobic retention and the increased accessibility of surface silanol groups that results when a short chain length bonded phase is used.

TABLE 22

| | Capacity Factor (k) | | | | |
|---|---|---|---|---|---|
| Product | Propranolol | Butyl Paraben | Naphthalene | Acenaphthene | Amitriptyline |
| Nova-Pak CN HP | 2.01 | 0.11 | 0.22 | 0.31 | 3.42 |
| Zorbax SB CN | 3.47 | 0.67 | 0.80 | 1.32 | 7.03 |
| NN | 0.36 | 0.10 | 0.42 | 0.53 | 0.94 |
| OO | 0.36 | 0.10 | 0.36 | 0.46 | 0.81 |
| PP | 0.68 | 0.09 | 0.38 | 0.48 | 1.35 |

TABLE 23

| | USP Tailing Factor | | | | |
|---|---|---|---|---|---|
| Product | Propranolol | Butyl Paraben | Naphthalene | Acenaphthene | Amitriptyline |
| Nova-Pak CN HP | 1.66 | 1.36 | 1.45 | 1.42 | 1.89 |
| Zorbax SB CN | 1.74 | — | — | 1.11 | 2.97 |
| NN | 1.23 | 1.22 | 1.47 | 1.49 | 1.41 |
| OO | 1.99 | 1.27 | 1.93 | 2.00 | 2.24 |
| PP | 1.32 | 1.03 | 1.47 | 1.47 | 2.16 |

The two commercial columns had longer retention times for the two basic analytes, propranolol and amitriptyline, in comparison to the neutral analytes. For the control hybrid particle, CN retention time for the bases was significantly less in comparison to the neutral markers, due to the lack of silanols on the surface. For the surface methyl group converted CN bonded phases, basic analyte retention was increased for one of the materials (PP) relative to the hybrid control, where now the two bases were the most retained, like the silica CN columns, albeit to a lesser degree. The other surface methyl group cleaved CN bonded phase (OO)

did not show a significant difference versus the control. This result may be due to the higher fluorine level on this particle, thereby resulting in a lower silanol content.

The CN modified hybrid particles of Example 11 were also studied for hydrolytic stability in both alkaline and acidic mobile phases. Four CN modified silica columns {here labeled: Ref 1—(3-cyanopropyl)dimethyl-siloxane), Ref 2—(3-cyanopropyl)trisiloxane, Ref 4—N-(2-cyanoethyl)-N-methyl-carbamate 3-(dimethylsiloxane) propyl, and Ref 5 (3-cyanopropyl)diisobutylsiloxane} described a recent publication were tested in the same way and are included for reference (O'Gara, J. E.; Alden, B. A.; Gendreau, C. A.; Iraneta, P. C.; Walter, T. H. *J. Chromatogr. A* 2000, 893, 245–251). The alkaline stability procedure is the same as described in Example 8, except 60 min increments were used in step 3 of the procedure. Column lifetime is redefined as the time of exposure to the pH 10 triethylamine solution when (a) the column pressure exceeded 6000 psi or (b) the efficiency of the column drops below 50%. The acid stability procedure is the same as described in Example 10 except the lifetime is redefined to time of exposure to the 1% trifluoroacetic acid/water mobile phase when the ethylparaben retention time was reduced to less than 70% of its original value. The stability data is shown in Table 24.

TABLE 24

| Product | Acidic Lifetime (h) | Alkaline Lifetime (h-failure mode) |
|---|---|---|
| Ref 1 | 4 | 3-a |
| Ref 2 | 41 | 2-a |
| Ref 4 | 4 | 6-b |
| Ref 5 | 53 | 4-a |
| NN | 77 | 9-b |
| OO | 137 | 8-a |
| PP | 145 | 6-a |

All three of the hybrid CN bonded phases showed significantly better stability at high and low pH in comparison to the silica based CN bonded phases, with the exception of the chain extended silica CN material, Ref 4. Both of the surface methyl group converted CN bonded phases had approximately a 1.8× increase in low pH stability in comparison to the hybrid CN control phase. At high pH, the surface methyl group converted CN bonded phases were less stable by approximately 11% (OO) and 33% (PP) in comparison to the control, again due to less surface protection resulting from the conversion of the surface methyl groups into hydroxyl and fluorine units. As a whole, the surface methyl group converted CN phases offer a broader operating pH range compared to the silica or hybrid control CN phases.

Equivalents

Those skilled in the art will recognize, or be able to ascertain using no more than routine experimentation, numerous equivalents to the specific procedures described herein. Such equivalents are considered to be within the scope of this invention and are covered by the following claims. The contents of all references, issued patents, and published patent applications cited throughout this application are hereby incorporated by reference.

What is claimed is:

1. A hybrid particle for chromatographic separations, said particle having an interior area and an exterior surface, said particle having a composition represented by:

$$[A]_y[B]_x \quad \text{(Formula I)},$$

wherein x and y are whole number integers and A is $$SiO_2/(R^1_p R^2_q SiO_t)_n \quad \text{(Formula II)}$$

and/or $$SiO_2/[R^3(R^1_r SiO_t)_m]_n \quad \text{(Formula III)};$$

wherein $R^1$ and $R^2$ are independently a substituted or unsubstituted $C_1$ to $C_7$ alkyl group, or a substituted or unsubstituted aryl group, $R^3$ is a substituted or unsubstituted $C_1$ to $C_7$ alkylene, alkenylene, alkynylene, or arylene group bridging two or more silicon atoms, p and q are 0, 1, or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2; and n is a number from 0.01 to 100; B is:

$$SiO_2/(R^4_v SiO_t)_n \quad \text{(Formula IV)}$$

wherein $R^4$ is hydroxyl, fluorine, alkoxy, aryloxy, substituted siloxane, protein, peptide, carbohydrate, nucleic acid, or combinations thereof, $R^4$ is not $R^1$, $R^2$, or $R^3$; v is 1 or 2, provided that when v=1, t=1.5, and when v=2, t=1; and n is a number from 0.01 to 100;

said interior of said particle having a composition of A; said exterior surface of said particle having a composition represented by A and B, and wherein said exterior composition is between about 1 and about 99% of the composition of B and the remainder comprising A.

2. The particle of claim 1 wherein said exterior surface has a composition that is between about 70 and about 90% of composition B, with the remainder comprising composition A.

3. The particle of claim 1 wherein said exterior surface has a composition that is between about 80 and about 90% of composition B, with the remainder comprising composition A.

4. The particle of claim 1 wherein $R^4$ is hydroxyl.
5. The particle of claim 1 wherein $R^4$ is fluorine.
6. The particle of claim 1 wherein $R^4$ is methoxy.
7. A bulk material comprising a population of the particles of claim 1, wherein said particles have a mean particle size of about 0.5 to 100 μm.
8. A bulk material comprising a population of the particles of claim 1, wherein said particles have a mean particle size of about 1 to 20 μm.
9. The particle of claim 1, having a specific surface area of about 50 to 800 m²/g.
10. The particle of claim 1, having a specific surface area of about 100 to 200 m²/g.
11. The particle of claim 1, having specific pore volumes of about 0.25 to 1.5 cm³/g.
12. The particle of claim 1, having specific pore volumes of about 0.5 to 1.0 cm³/g.
13. The particle of claim 1, having an average pore diameter of about 50 to 500 Å.
14. The particle of claim 1, having an average pore diameter of about 100 to 300 Å.
15. The particle of claim 1, having been surface modified by polymer coating.

16. The particle of claim 1 wherein $R^4$ is $$—OSi(R^5)_2—R^6 \quad \text{(Formula V)}$$

wherein $R^5$ is a $C_1$ to $C_6$ straight, cyclic, or branched alkyl, or alkoxy group, a hydroxyl group, or a siloxane group, and $R^6$ is a $C_1$ to $C_{36}$ straight, cyclic, or branched alkyl, aryl, or alkoxy group, wherein $R^6$ is unsubstituted or substituted with one or more moieties selected from the group consisting of halogen, cyano, amino, diol, nitro, ether, carbonyl, epoxide, sulfonyl, cation exchanger, anion exchanger, carbamate, amide, urea, peptide, protein, carbohydrate, nucleic acid functionalities, and combinations thereof.

17. The particle of claim 16 wherein $R^6$ is a $C_{18}$ group.

18. The particle of claim 16 wherein $R^6$ is a cyanopropyl group.

19. The particle of claim 16, having a surface concentration of $R^6$ greater than about 2.5 $\mu$mol/m$^2$.

20. The particle of claim 16, having a surface concentration of $R^6$ greater than about 3.0 $\mu$mol/m$^2$.

21. The particle of claim 16, having a surface concentration of $R^6$ greater than about 3.5 $\mu$mol/m$^2$.

22. The particle of claim 16, having a surface concentration of $R^6$ between about 2.5 and 3.7 $\mu$mol/m$^2$.

23. A bulk material comprising a population of the particles of claim 19, having a mean particle size of about 0.5 to 100 $\mu$m.

24. A bulk material comprising a population of the particles of claim 19, having a mean particle size of about 1 to 20 $\mu$m.

25. The particles of claim 19, having a specific surface area of about 50–800 m$^2$/g.

26. The particles of claim 19, having a specific surface area of about 100–200 m$^2$/g.

27. The particles of claim 19, having specific pore volumes of about 0.25 to 1.5 cm$^3$/g.

28. The particles of claim 19, having specific pore volumes of about 0.5 to 1.0 cm$^3$/g.

29. The particles of claim 19, having an average pore diameter of about 50 to 500 Å.

30. The particles of claim 19, having an average pore diameter of about 100 to 300 Å.

31. The particles of claim 19, which have been surface modified by polymer coating.

32. A method of performing a separation comprising running a sample through a column containing particles of claim 19.

33. A method of performing a chromatographic separation comprising running a sample through a column containing particles of claim 1.

34. A separation device comprising the particles of claim 1.

35. The separation device of claim 34, said device selected from the group consisting of chromatographic columns, filtration membranes, sample clean up devices, and microtiter plates.

36. A method of preparing hybrid chromatographic particles, comprising:
a) prepolymerizing a mixture of an organoalkoxysilane and a tetraalkoxysilane in the presence of an acid catalyst to produce a polyalkoxysiloxane.
b) preparing an aqueous suspension of said polyalkoxysiloxane, said suspension further comprising a surfactant, and gelling in the presence of a base catalyst so as to produce porous particles having silicon $C_1$ to $C_7$ alkyl groups, substituted or unsubstituted aryl groups, substituted or unsubstituted $C_1$ to $C_7$ alkylene, alkenylene, alkynylene, or arylene groups.
c) modifying the pore structure of said porous particles by hydrothermal treatment; and
d) replacing one or more surface $C_1$ to $C_7$ alkyl groups, substituted or unsubstituted aryl groups, substituted or unsubstituted $C_1$ to $C_7$ alkylene, alkenylene, alkynylene, or arylene groups of the particle with hydroxyl, fluorine, alkoxy, aryloxy, or substituted siloxane groups.

37. The method of claim 36, wherein said replacing involves reacting the hybrid particle with aqueous $H_2O_2$, KF, and $KHCO_3$ in an organic solution.

38. The method of claim 36, wherein the molar ratio of said organotrialkoxysilane and tetraalkoxysilane is about 100:1 to 0.01:1.

39. The method of claim 36, wherein said surfactant is an alkylphenoxypolyethoxyethanol.

40. The method of claim 36, wherein said suspension further comprises a porogen.

41. The method of claim 36, wherein said tetraalkoxysilane is tetramethoxysilane or tetraethoxysilane.

42. The method of claim 36, wherein said particles have a composition represented by:

$$[A]_y[B]_x \quad \text{(Formula I)},$$

wherein x and y are whole number integers and A is $$SiO_2/(R^1_p R^2_q SiO_t)_n \quad \text{(Formula II)}$$

and/or $$SiO_2/[R^3(R^1_r SiO_t)_m]_n \quad \text{(Formula III);}$$

wherein $R^1$ and $R^2$ are independently a substituted or unsubstituted $C_1$ to $C_7$ alkyl group, or a substituted or unsubstituted aryl group, $R^3$ is a substituted or unsubstituted $C_1$ to $C_7$ alkylene, alkenylene, alkynylene, or arylene group bridging two or more silicon atoms, p and q are 0, 1, or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2; and n is a number from 0.01 to 100; B is:

$$SiO_2/(R^4_v SiO_t)_n \quad \text{(Formula IV)}$$

wherein $R^4$ is hydroxyl, fluorine, alkoxy, aryloxy, substituted siloxane, protein, peptide, carbohydrate, nucleic acid, or combinations thereof, $R^4$ is not $R^1$, $R^2$, or $R^3$; V is 1 or 2, provided that when v=1, t=1.5, and when v=2, t=1; and n is a number from 0.01 to 100;

said interior of said particle having a composition of A; said exterior surface of said particle having a composition represented by A and B, and wherein said exterior composition is between about 1 and about 99% of the composition of B and the remainder comprising A.

43. The particle formed by the method of claim 36.

* * * * *